(12) United States Patent
Lou et al.

(10) Patent No.: US 12,733,035 B2
(45) Date of Patent: Sep. 8, 2026

(54) ENHANCED TRIGGER FRAME AND ITS VARIANTS

(71) Applicant: INTERDIGITAL PATENT HOLDINGS, INC., Wilmington, DE (US)

(72) Inventors: Hanqing Lou, Syosset, NY (US); Mahmoud Saad, Montreal (CA); Xiaofei Wang, North Caldwell, NJ (US); Zinan Lin, Basking Ridge, NJ (US); Rui Yang, Greenlawn, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 295 days.

(21) Appl. No.: 18/284,153

(22) PCT Filed: Mar. 30, 2022

(86) PCT No.: PCT/US2022/022498
§ 371 (c)(1),
(2) Date: Sep. 26, 2023

(87) PCT Pub. No.: WO2022/212468
PCT Pub. Date: Oct. 6, 2022

(65) Prior Publication Data

US 2025/0048428 A1 Feb. 6, 2025

Related U.S. Application Data

(60) Provisional application No. 63/317,840, filed on Mar. 8, 2022, provisional application No. 63/178,716, filed
(Continued)

(51) Int. Cl.
*H04W 74/0816* (2024.01)
*H04W 74/08* (2024.01)
*H04W 84/12* (2009.01)

(52) U.S. Cl.
CPC ... *H04W 74/0816* (2013.01); *H04W 74/0866* (2013.01); *H04W 84/12* (2013.01)

(58) Field of Classification Search
CPC .... H04W 72/20; H04W 80/06; H04B 7/0417; H04B 7/0456; H04B 7/0626; H04B 7/0634; H04B 7/0658; H04B 7/06
See application file for complete search history.

(56) References Cited

U.S. PATENT DOCUMENTS

2018/0242331 A1* 8/2018 Zhu ........................ H04L 5/0053
2019/0141717 A1* 5/2019 Yang .................. H03M 13/1102
(Continued)

OTHER PUBLICATIONS

U.S. Appl. No. 63/055,599, filed Jul. 23, 2020 (Year: 2020).*
(Continued)

*Primary Examiner* — Sun Jong Kim
(74) *Attorney, Agent, or Firm* — Volpe Koenig

(57) ABSTRACT

A station (STA) receives a parameterized spatial reuse (PSR) reception (PSRR) trigger frame from an overlapping basic service set access point (AP). The PSRR trigger frame includes a special user information field including a plurality of PSR subfields, each PSR subfield including a respective PSR value. The STA determines a received power level of the PSRR frame per each 20 MHz channel over which the PSRR frame is received. The STA determines a transmission power for a PSR transmission (PSRT) for transmission to an associated AP based on a minimum PSR value determined as a minimum of the plurality of respective PSR values, the determined received power level of the PSRR frame at the STA per each 20 MHz channel over which the PSRR frame is received, and an effective bandwidth of the PSRT frame. The station transmits the PSRT frame at the determined transmission power.

2 Claims, 12 Drawing Sheets

Related U.S. Application Data on Apr. 23, 2021, provisional application No. 63/170,918, filed on Apr. 5, 2021, provisional application No. 63/168,035, filed on Mar. 30, 2021.

(56) References Cited

U.S. PATENT DOCUMENTS

2021/0160959 A1* 5/2021 Cao ....................... H04L 5/0044
2022/0030572 A1* 1/2022 Shellhammer ........ H04L 5/0096

OTHER PUBLICATIONS

Au, "Specification Framework for TGbe," IEEE 802.11-20/1262r15 (Sep. 2020).
Chu et al., "Trigger Consideration," IEEE 802.11-20/0764r0 (May 2020).
Das et al., "MAC: Triggered SU Operation," IEEE 802.11-21/0087r6 (Jan. 2021).
Das et al., "PDT: Channel Access for Triggered TXOP Sharing," IEEE 802.11-21/0268r0 (Mar. 2021).
Draft IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 8: Enhancements for extremely High throughput (EHT), IEEE 802.11be/D1.4 (Jan. 2022).
Draft IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 8: Enhancements for extremely High throughput (EHT), IEEE 802.11be/D0.4 (Mar. 2021).
Draft IEEE Standard for Information technology—Telecommunications and information exchange between systems Local and metropolitan area networks—Specific requirements; Part 11: Wireless LAN Medium Access Control (MAC) and Physical Layer (PHY) Specifications, IEEE P802.11-REVme/D0.0 (Mar. 2021).
Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 1: Enhancements for High Efficiency WLAN, IEEE P802.11ax/D8.0 (Oct. 2020).
Gan et al., "Backward compatible EHT trigger frame," IEEE 802.11-20/0840-00-00be (Jun. 2020).
Han et al., "Trigger Frame for Frequency-domain A-PPDU Support," IEEE 802.11-20/0831r0 (Mar. 2020).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 1: Enhancements for High Efficiency WLAN, IEEE 802.11ax-2021 (Feb. 2021).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2020 (Dec. 3, 2020).
Kim et al., "RU Allocation Subfield Design for EHT Trigger Frame," IEEE 802.11-20/0828r1 (May 2020).
Ko et al., "TB PPDU Format Signaling in Trigger Frame," IEEE 802.11-20/1192r0 (Aug. 2020).
Li et al., "Spec Text for TXOP Return for Triggered SU," IEEE 802.11-21/0552r0 (May 2021).
Lin et al., "Discussion on Spatial Reuse Issues," IEEE 802.11-21/0601r5 (Apr. 2021).
Shellhammer et al., "Enhanced Trigger Frame for EHT Support," IEEE 802.11-20/1429r2 (Oct. 2020).
Shellhammer et al., "Enhanced Trigger Frame for EHT Support," IEEE 802.11-20/1429r4 (Jan. 2021).
Yu et al., " PDT-EHT-PSR-based-SR," IEEE 802.11-21/0960r1 (Jun. 2021).
Yu et al., "PDT-EHT-PSR-based-SR," IEEE 802.11-21/0440r2 (Mar. 2021).
Yu et al., "PSR-based SR Normalization Discussion," IEEE 802.11-21/0269r1 (Feb. 2021).

* cited by examiner

Figure 1C:
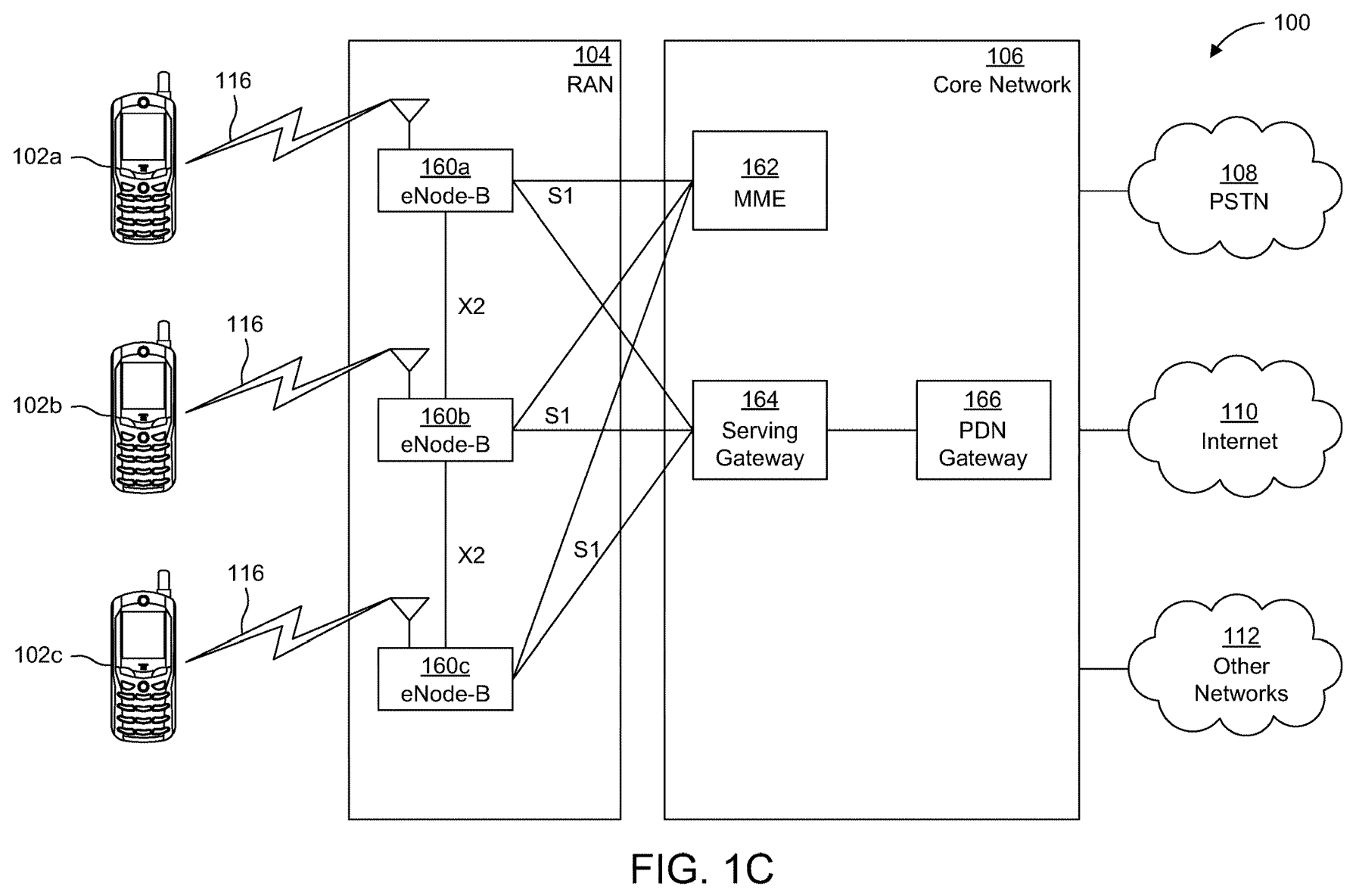

100

108 PSTN

110 Internet

112 Other Networks

106 Core Network

162 MME

164 Serving Gateway

166 PDN Gateway

104 RAN 160a eNode-B 160b eNode-B 160c eNode-B

Figure 1D:
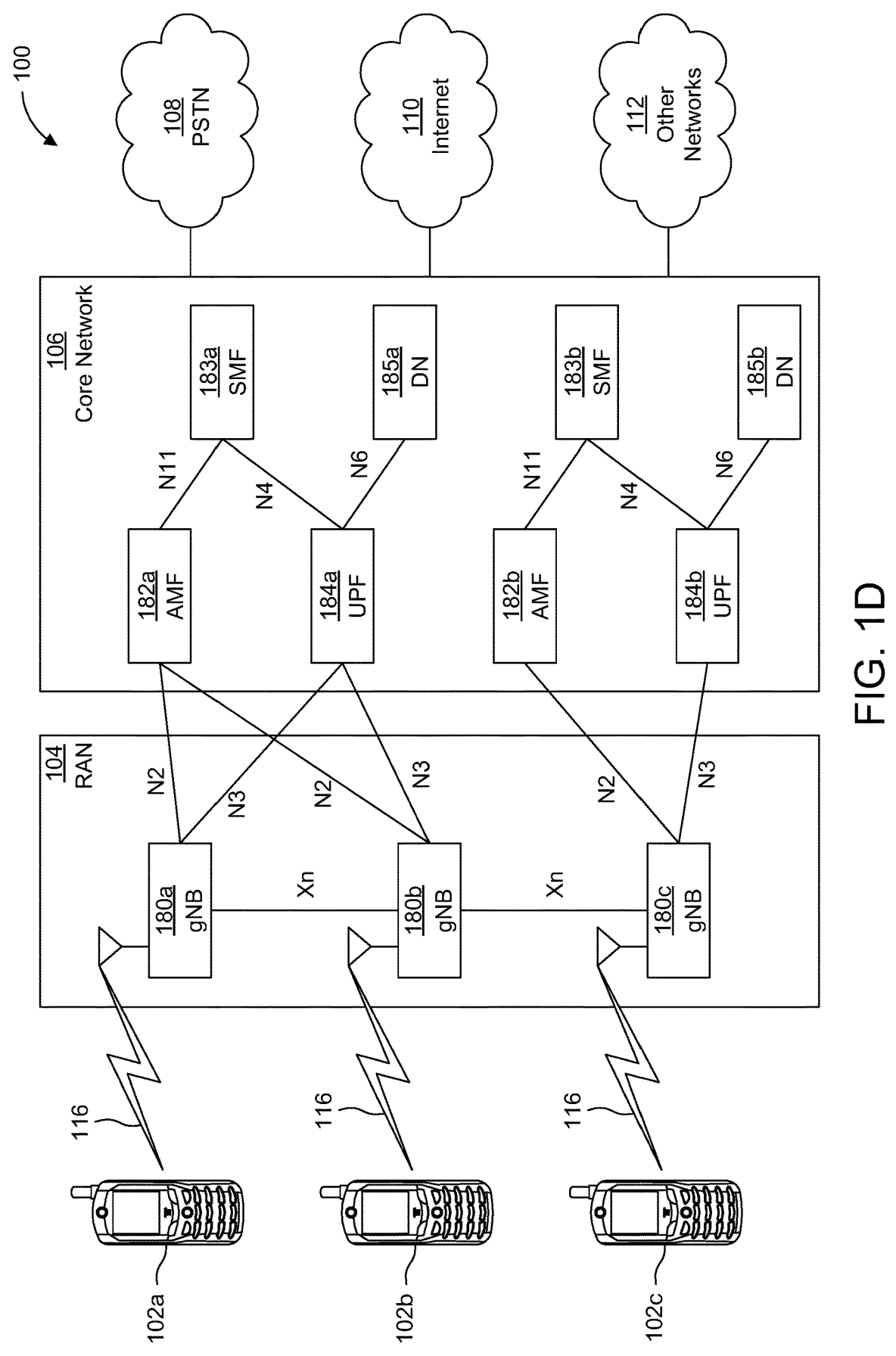

108 PSTN

110 Internet

112 Other Networks

106 Core Network

182a AMF

183a SMF

184a UPF

185a DN

182b AMF

183b SMF

184b UPF

185b DN

N11 N4 N6

104 RAN 180a gNB 180b gNB 180c gNB

AP
Trigger Frame
HE STA
HE TB PPDU
EHT STA 1
EHT TB PPDU
EHT STA 2
HE TB PPDU

FIG. 7

ENHANCED TRIGGER FRAME AND ITS VARIANTS

CROSS-REFERENCE TO RELATED APPLICATIONS

This application is the U.S. National Stage, under 35 U.S.C. § 371, of International Application No. PCT/US2022/022498 filed Mar. 30, 2022, which claims the benefit of U.S. Provisional Application No. 63/168,035, filed Mar. 30, 2021, U.S. Provisional Application No. 63/170,918, filed Apr. 5, 2021, U.S. Provisional Application No. 63/178,716, filed Apr. 23, 2021, and U.S. Provisional Application No. 63/317,840, filed Mar. 8, 2022, the contents of which are incorporated herein by reference.

BACKGROUND

The IEEE 802.11 Extremely High Throughput (EHT) or 802.11be supports greater bandwidth (BW), multiple resource unit (RU) allocation, enhanced modulation and coding scheme (MCS) and greater number of spatial streams. The primary use cases and applications addressed include high throughput and low latency applications such as Video-over-WLAN, augmented reality and virtual reality. Specifically, the list of features that 802.11be provides may include multi-AP, multi-band/multi-link, 320 MHz bandwidth, 16 spatial streams, Hybrid Automatic Repeat Request (HARQ), access point (AP) coordination, and/or new designs for 6 GHz channel access. Current trigger frame (TF) design needs to be modified to signal the resource allocation from the AP and signal new or additional fields for these enhanced features.

SUMMARY

Methods and apparatuses are described herein for an enhanced trigger fame and its variants. A method performed by a first station (STA) may compromise: receiving, from an access point (AP) that has an established transmission opportunity (TXOP) with a second STA, a multi-user request-to-send (MU-RTS) transmission opportunity (TXOP) sharing (TXS) trigger frame, wherein the MU-RTS TXS trigger frame includes: (i) an indication that the AP is sharing the TXOP established with the second STA with the first STA, and (ii) an indication of a duration of the shared TXOP; and transmitting, in response to the MU-RTS TXS trigger frame, one or more uplink (UL) frames within the duration of the shared TXOP indicated by the MU-RTS TXS trigger frame.

The one or more UL frames may include one or more non-trigger based (non-TB) physical layer protocol data units (PPDUs). The non-TB PPDU of the one or more TB PPDUs transmitted by the first STA may include a clear-to-send (CTS) frame. The MU-RTS TXS trigger frame may include one or more user information fields associated with the first STA. The MU-RTS TXS trigger frame may include a special user information field. Responsive to a TXOP sharing mode field of the MU-RTS TXS trigger frame having a value of 1, the STA may transmit the one or more UL frames to the AP. Responsive to a TXOP sharing mode field of the MU-RTS TXS trigger frame having a value of 2, the STA may transmit the one or more UL frames to another STA. The MU-RTS TXS trigger frame may include an indication that the AP is sharing the TXOP established with the second STA with a plurality of STAs.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 1C is a system diagram illustrating an example radio access network (RAN) and an example core network (CN) that may be used within the communications system illustrated in FIG. 1A according to an embodiment;

FIG. 1D is a system diagram illustrating a further example RAN and a further example CN that may be used within the communications system illustrated in FIG. 1A according to an embodiment;

FIG. 7 is a diagram illustrating an example trigger frame for aggregated-physical layer (PHY) protocol data unit (A-PPDU)

DETAILED DESCRIPTION

Figure 1A:
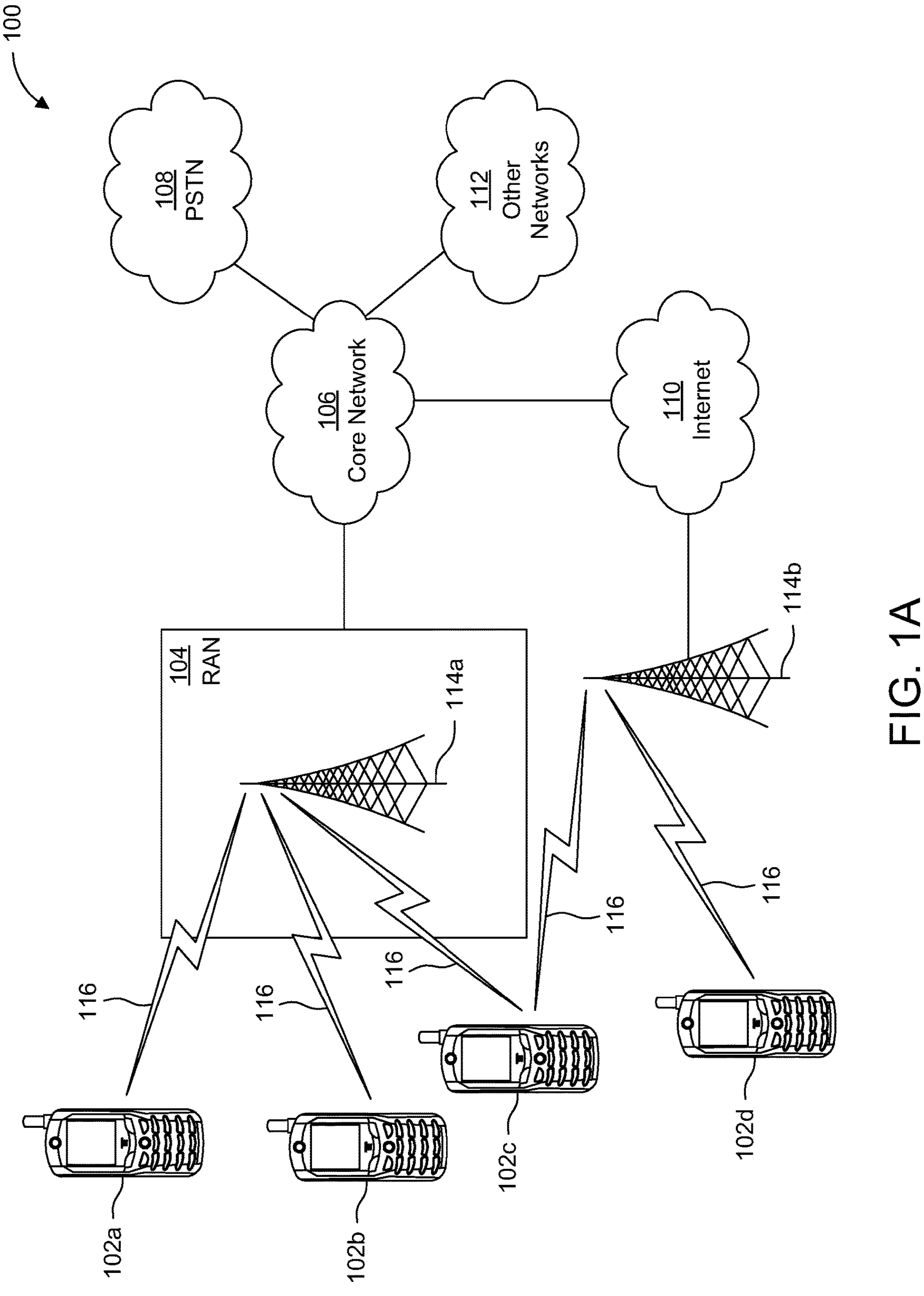
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106, the Internet 110, and/or the other networks 112. By way of example, the base stations 114*a*, 114*b* may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, and the like. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using NR.

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106.

The RAN 104 may be in communication with the CN 106, which may be any type of network configured to provide voice, data, applications, and/or voice over internet protocol (VOIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
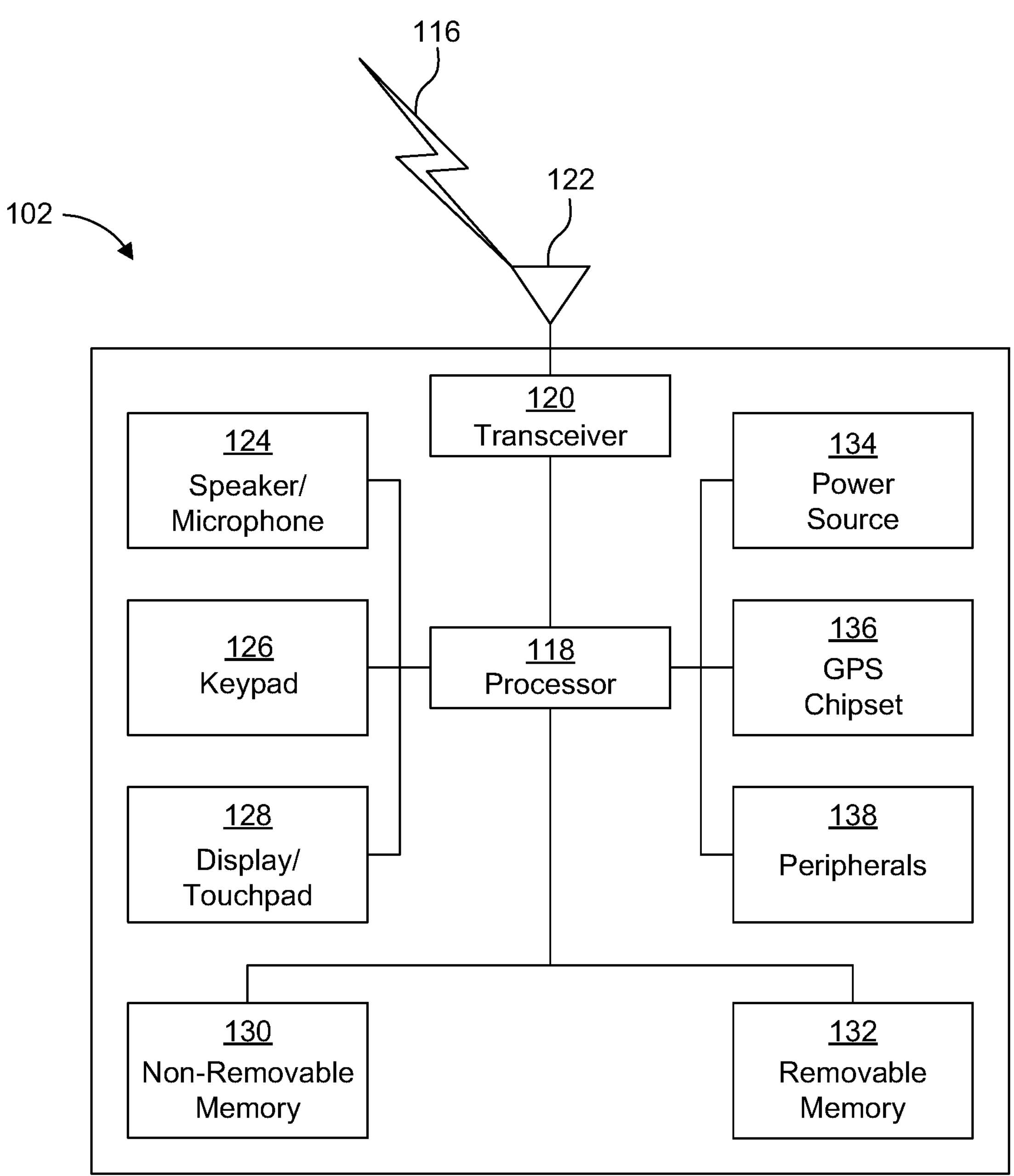
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHZ, and 20 MHz bandwidths in the TV White Space (TVWS) spectrum, and 802.11ah supports 1 MHz, 2 MHZ, 4 MHZ, 8 MHz, and 16 MHz bandwidths using non-TVWS spectrum. According to a representative embodiment, 802.11ah may support Meter Type control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

FIG. 1D is a system diagram illustrating the RAN 104 and the CN 106 according to an embodiment. As noted above, the RAN 104 may employ an NR radio technology to communicate with the WTRUs 102*a*, 102*b*, 102*c* over the air interface 116. The RAN 104 may also be in communication with the CN 106.

The RAN 104 may include gNBs 180*a*, 180*b*, 180*c*, though it will be appreciated that the RAN 104 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (COMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 106 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While the foregoing elements are depicted as part of the CN 106, it will be appreciated that any of these elements may be owned and/or operated by an entity other than the CN operator.

The AMF 182*a*, 182*b* may be connected to one or more of the gNBs 180*a*, 180*b*, 180*c* in the RAN 104 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of non-access stratum (NAS) signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and the like. The AMF 182*a*, 182*b* may provide a control plane function for switching between the RAN 104 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 106 via an N11 interface. The SMF 183*a*, 183*b* may also be connected to a UPF 184*a*, 184*b* in the CN 106 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 104 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local DN 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A WLAN in Infrastructure Basic Service Set (BSS) mode has an Access Point (AP) for the BSS and one or more stations (STAs) associated with the AP. The AP typically has access or interface to a Distribution System (DS) or another type of wired/wireless network that carries traffic in and out of the BSS. Traffic to STAs that originates from outside the BSS arrives through the AP and is delivered to the STAs. Traffic originating from STAs to destinations outside the BSS is sent to the AP to be delivered to the respective destinations. Traffic between STAs within the BSS may also be sent through the AP where the source STA sends traffic to the AP and the AP delivers the traffic to the destination STA.

Using the 802.11ac infrastructure mode of operation, the AP may transmit a beacon on a fixed channel, usually the primary channel. This channel may be 20 MHz wide, and is the operating channel of the BSS. This channel is also used by the STAs to establish a connection with the AP. The fundamental channel access mechanism in an 802.11 system is Carrier Sense Multiple Access with Collision Avoidance (CSMA/CA). In this mode of operation, every STA, including the AP, will sense the primary channel. If the channel is detected to be busy, the STA backs off. Hence only one STA may transmit at any given time in a given BSS.

In 802.11n, High Throughput (HT) STAs may also use a 40 MHz wide channel for communication. This is achieved by combining the primary 20 MHz channel, with an adjacent 20 MHz channel to form a 40 MHz wide contiguous channel.

In 802.11ac, Very High Throughput (VHT) STAs may support 20 MHZ, 40 MHZ, 80 MHZ, and 160 MHz wide channels. The 40 MHz, and 80 MHz, channels are formed by combining contiguous 20 MHz channels similar to 802.11n described above. A160 MHz channel may be formed either by combining 8 contiguous 20 MHz channels, or by combining two non-contiguous 80 MHz channels, this may also be referred to as an 80+80 configuration. For the 80+80 configuration, the data, after channel encoding, is passed through a segment parser that divides it into two streams. IFFT, and time domain, processing are done on each stream separately. The streams are then mapped on to the two channels, and the data is transmitted. At the receiver, this mechanism is reversed, and the combined data is sent to the MAC.

To improve spectral efficiency, 802.11ac has introduced the concept for downlink Multi-User MIMO (MU-MIMO) transmission to multiple STA's in the same symbol's time frame, for example, during a downlink OFDM symbol. The potential for the use of downlink MU-MIMO is also currently considered for 802.11ah. Because downlink MU-MIMO, as it is used in 802.11ac, uses the same symbol timing to multiple STA's, interference of the waveform transmissions to multiple STA's is not an issue. However, all STA's involved in MU-MIMO transmission with the AP may use the same channel or band, this limits the operating bandwidth to the smallest channel bandwidth that is supported by the STA's which are included in the MU-MIMO transmission with the AP.

Figure 2:
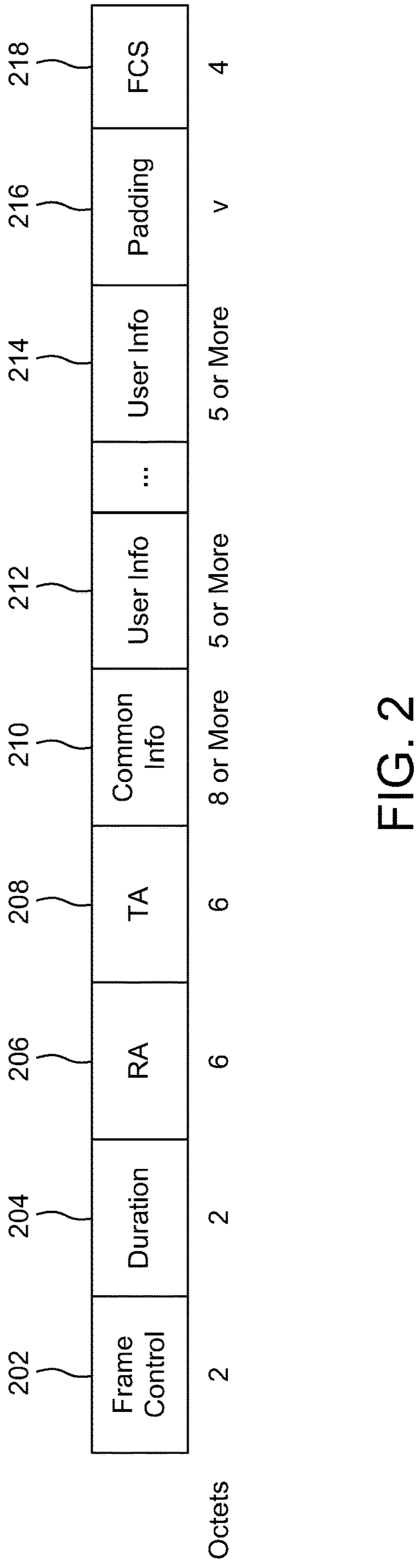
FIG. 2 is a diagram illustrating an example trigger frame format.

FIG. 2 is a diagram illustrating an example trigger frame format which may be used in 802.11ax or later. A trigger frame may be used to allocate resources and trigger single or multi-user access. As shown in FIG. 2, the trigger frame may include a frame control field 202, duration field 204, RA field 206, TA field 208, user information field 212, user information field 214, padding field 216, and FCS field 218. The frame control field 202 may have a length of two octets. The duration field 204 may have a length of 2 octets. The RA field 206 may have a length of 6 octets. The TA field 208 may have a length of 6 octets. The common information field 210 may have a length of 5 or more octets. The user information field 214 may have a length of 5 or more octets. The padding field 216 may have a variable octet length. The FCS field may have a length of 4 octets.

It is noted that the control information subfield in a triggered response scheduling (TRS) control subfield in A-control subfield of the HE variant HT control field may contain triggered response scheduling (TRS) information for soliciting an EHT TB PPDU that follows an EHT MU PPDU carrying the control subfield. In one method, the PPDU Type and Compression Mode subfield in U-SIG of the EHT MU PPDU that carries the TRS control subfield may be set to 0 so that the RU allocation subfield may present in the EHT MU PPDU that carries the TRS. In one method, the TRS control subfield may not be included in an EHT MU PPDU that is with PPDU Type and Compression Mode subfield in U-SIG set to any value other than 0. In one method, the TRS control subfield may not be included in an EHT MU PPDU that does not carry RU allocation subfield in the EHT-SIG field.

Figure 3:
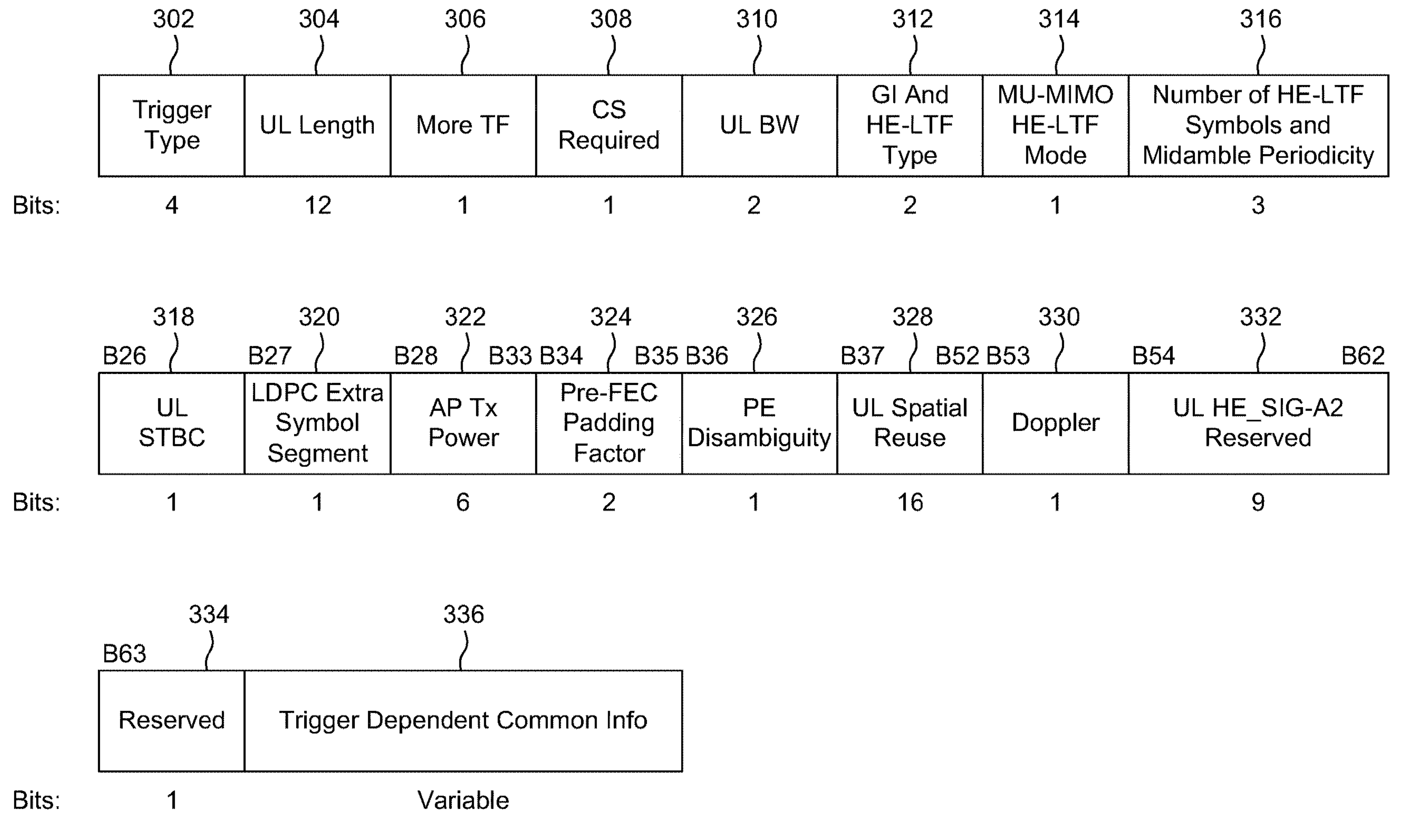
FIG. 3 is a diagram illustrating an example common information field in a trigger frame.

FIG. 3 is a diagram illustrating an example common information field 210 in a trigger frame. The common information field 210 may have a trigger type subfield 302, uplink length subfield 304, more trigger frame field 306, CS required subfield 308, GI and HE-LTF subfield 312, MU-MIMO HE-LTF mode subfield 314, number of HE-LTF symbol and midamble periodicity subfield 316, uplink STBC field 318, LDPC extra symbol segment subfield 320, AP transmission power subfield 322, pre-FEC padding factor subfield 324, PE disambiguity subfield 326, uplink spatial reuse subfield 328, doppler subfield 330, uplink HE-SIG-A2 reserved subfield 332, reserved subfield 334, and trigger dependent common information subfield 336.

The trigger type subfield 302 may be 4 bits. The uplink length subfield 304 may be 12 bits. The more trigger frame subfield 306 may be 1 bit. The CS required subfield 308 may be 1 bit. The uplink bandwidth subfield 310 may be 2 bits. The GI and HE-LTF type subfield 312 may be 2 bits. The MU-MIMO HE-LTF mode subfield 314 may be 1 bit. The number of HE-LTF symbol and midamble periodicity subfield 316 may be 3 bits. The uplink STBC field 318 subfield may be 1 bit. The LDPC extra symbol segment subfield 320 may be 1 bit. AP transmission power subfield 322 subfield may be 6 bits. The pre-FEC padding factor subfield 324 may be 2 bits. The PE disambiguity subfield 326 may be 1 bit. The uplink spatial reuse subfield 328 subfield may be 16 bits. The doppler subfield 330 may be 1 bit. The uplink HE-SIG-A2 reserved subfield 332 may be 9 bits. The reserved subfield 334 may be 1 bit. The trigger dependent common information subfield 336 may be variable bits.

Figure 4:
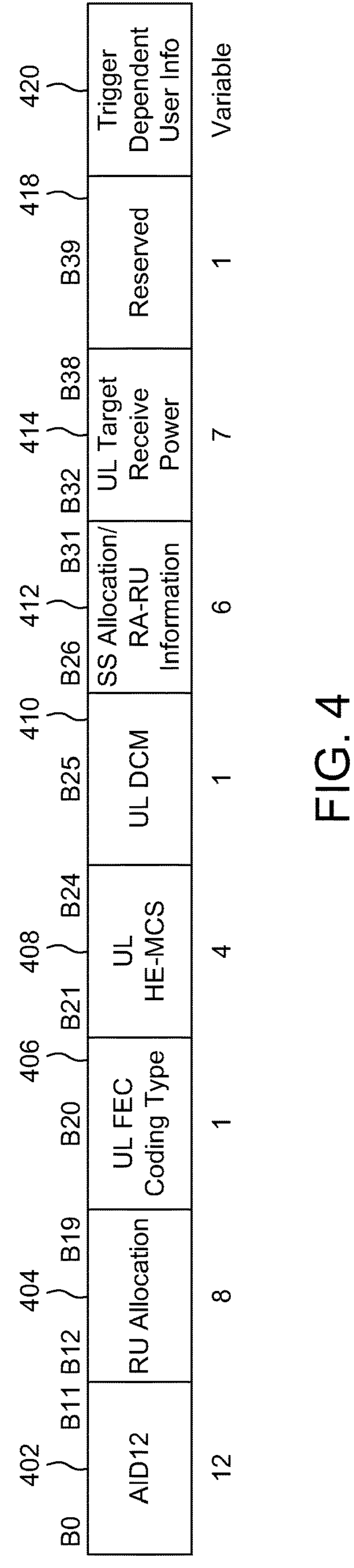
FIG. 4 is a diagram illustrating an example user information field in a trigger frame.

FIG. 4 illustrates an example user information field for all trigger types except Null Data Packet (NDP) Feedback Report Poll (NFRP) trigger. The user information field may include an AID12 subfield 402, RU allocation subfield 404, UL FEC coding type subfield 406, UL HE-MCS subfield 408, UL DCM subfield 410, SS allocation/RA-RU information subfield 412, UL target receive power subfield 414, reserved subfield 418, and trigger dependent user information subfield 420. The AID12 subfield may be 12 bits. The RU allocation subfield 404 may be 8 bits. The UL FEC coding type subfield 406 may be 406 bits. The UL HE-MCS subfield 408 may be 4 bits. The UL DCM subfield 410 may be 1 bit. The SS allocation/RA-RU information subfield 412 may be 6 bits. The UL target receive power subfield 414 may be 7 bits. The reserved subfield 418 may be 1 bit. The trigger dependent user information field 420 may be variable bits.

A trigger type subfield in a common information field may include possible values for trigger types as shown in Table 1.

TABLE 1

| Trigger Type Subfield | |
|---|---|
| Trigger Type subfield value | Trigger Frame Variant |
| 0 | Basic |
| 1 | BF Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll (NFRP) |
| 8-15 | Reserved |

A multi-user-request to send (MU-RTS) frame (or MU-RTS trigger frame), for example in 802.11ax, may be used to trigger clear-to-send (CTS) frames from one or more STAs. A resource unit (RU) allocation subfield in a user information field may indicate whether the CTS frame is transmitted on the primary 20 MHz channel, primary 40 MHz channel, primary 80 MHz channel, 160 MHz channel, or 80+80 MHz channel.

Figure 5:
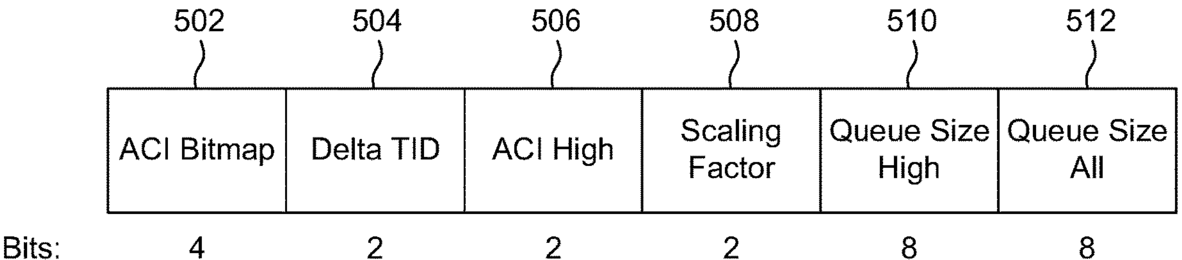
FIG. 5 is a diagram illustrating an example control information subfield format in a buffer status report (BSR) control subfield.

FIG. 5 is a diagram illustrating an example control information subfield format in a buffer status report (BSR) control subfield. As shown in FIG. 5, the control information subfield may include a ACI bitmap subfield 502, delta TID subfield 504, ACI high subfield 506, scaling factor subfield 508, queue size high subfield 510, and queue size all subfield 512. The ACI bitmap subfield 502 may be 4 bits. The delta TID subfield 504 may be 2 bits. The ACI subfield 506 may be 2 bits. The scaling factor subfield 508 may be 2 bits. The queue size high subfield 510 may be 8 bits. The queue size all subfield may be 8 bits.

An AP may transmit buffer status report poll (BSRP) frame (or BSRP trigger frame. For example, in 802.11ax, to trigger Buffer Status Report (BSR). BSR may be carried in BSR control field in MAC header as illustrated in FIG. 5.

Figure 6:
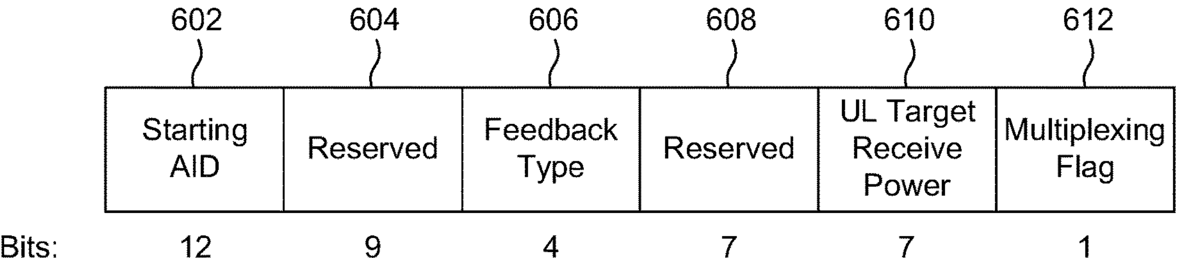
FIG. 6 is a diagram illustrating an example user information field format in a null data packet (NDP) Report Poll (NFRP) trigger frame.

FIG. 6 is a diagram illustrating an example user information field format in a null data packet (NDP) report poll (NFRP) trigger frame, for example, in 802.11ax. The user information field may include a starting AID subfield 602, reserved subfield 604, feedback type subfield 606, reserved subfield 608, UL target receive power subfield 610, and multiplexing flag subfield 612. The starting AID subfield may be 12 bits. The reserved subfield 604 may be 9 bits. The feedback type subfield 606 may be 4 bits. The reserved subfield 608 may be 7 bits. The UL target receive power subfield may be 7 bits. The multiplexing flag subfield 612 may be 1 bit.

The feedback type subfield set to value 0 may indicate a resource request. The rest values may be reserved. The total number of STAs, $N_{STA}$, that are scheduled to respond to the NFRP Trigger frame may be calculated using $N_{STA}=18\times 2^{BW}\times(\text{MultiplexingFlag}+1)$. A STA with AID value between the range [Starting AID, Starting AID+$N_{STA}-1$] may be eligible to respond the NFRP Trigger frame.

The IEEE 802.11 extremely high throughput (EHT) may be considered as the next major revision to IEEE 802.11 standards following 802.11ax. EHT may explore the possibility to further increase peak throughput and improve efficiency of the IEEE 802.11 networks. The primary use cases and applications addressed include high throughput and low latency applications such as video-over-WLAN, augmented reality (AR) and virtual reality (VR). A list of features in the EHT and/or 802.11be to achieve the target of increased peak throughput and improved efficiency include, but are not limited to, multi-AP, multi-band/multi-link, 320 MHz bandwidth, 16 spatial streams, HARQ, AP coordination, and new designs for 6 GHz channel access.

EHT supports greater BW, multiple RU allocation, enhanced MCS and greater number of spatial streams. trigger frame design may need to be modified to signal the allocation from the AP for these enhanced features and to signal the new fields of U-SIG of the TB-PPDU. EHT-TB-PPDU may be used for the RU allocation in a trigger frame. Furthermore, EHT may define frequency domain aggregation of aggregated PPDUs. Aggregated PPDU may comprise multiple PPDUs. The PPDU format combination may limit to EHT and HE. Other combinations may be possible. For the PPDU using HE format, the PPDU BW may be determined. The number of PPDUs may be determined. A-PPDU may be an R2 feature.

Figure 7:
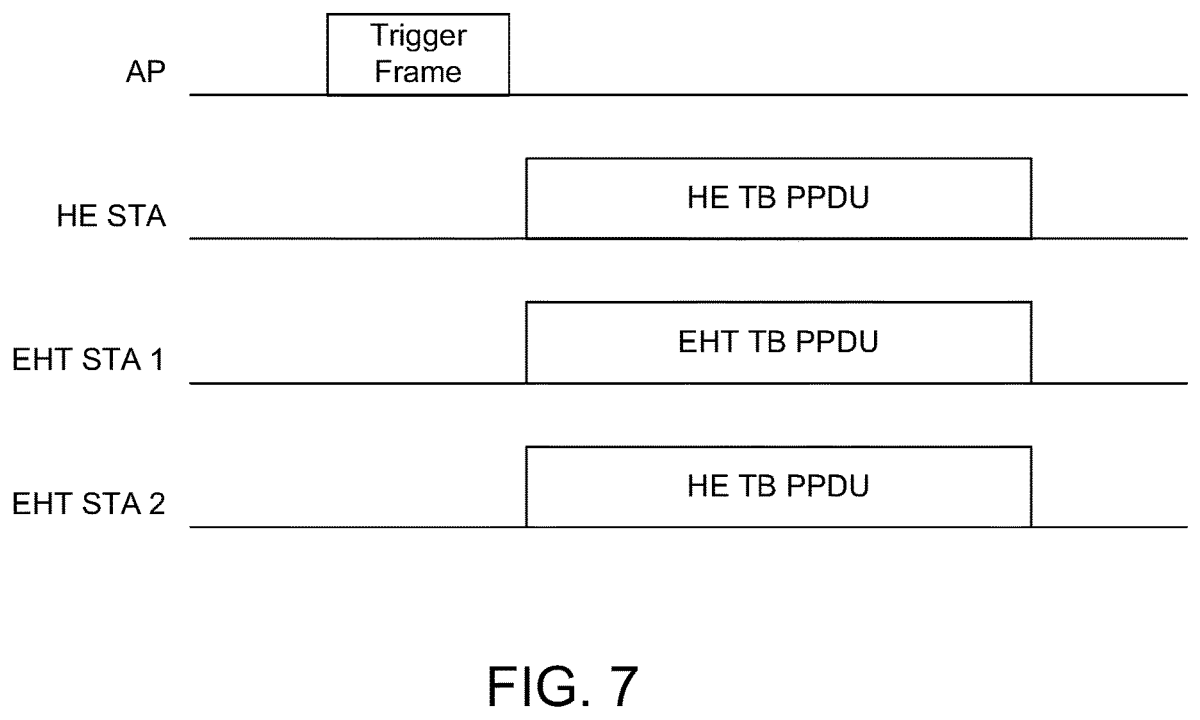

FIG. 7 is a diagram illustrating an example trigger frame for aggregated-physical layer (PHY) protocol data unit (A-PPDU). As shown in FIG. 7, the A-PPDU in UL from multiple STAs supporting different amendments may require a backward compatible trigger frame.

802.11be may also support multi-link operations (MLO) in which a STA may perform independent EDCA or triggered access on each link if it supports simultaneous transmit and receive (STR). Because of the independent access, in MLO, trigger frame and MLO may be related to trigger frame transmission(s) to a non-simultaneous transmit and receive (NSTR) non-AP Multi-link Device (MLD).

802.11be may support the following trigger frame transmission rule in the MLO. An AP in the AP MLD may not send a trigger frame with the CS required subfield set to 1 to a STA in a non-STR non-AP MLD, when at least one PPDU from other STAs affiliated to the same non-STR non-AP MLD is scheduled for transmission before (aSIFSTime+aSignalExtention−aRxTxTurnaroundTime) has expired after the PPDU including the Trigger frame. It is noted that in the above, aRxTxTurnaroundTime may be 4 μs. It is noted that the ending time of a first PPDU that is carrying a frame soliciting an immediate response frame cannot be earlier more than aRxTxTurnaroundTime of the ending time of a second PPDU including a trigger frame with the CS required subfield set to 1. It is noted that the AP STA may still follow the CS required rule defined in 802.11ax.

802.11be may support the following trigger frame transmission rule in the MLO in R1. When an AP MLD triggers simultaneously TB PPDUs from more than one STAs affiliated to the same non-STR non-AP MLD and allows the frames in the TB PPDUs to solicit control response frames from the AP MLD, then the UL Length subfield values in the soliciting trigger frames may be set to the same value.

802.11be may support that the padding procedures of 802.11ax may be used when transmitting a trigger frame to extend the frame length to meet the ending time requirement of the PPDU carrying the trigger frame in the MLO.

Communications between multiple APs (MAPs) may be over the air and a trigger frame may be used as a possible frame for the frame exchanges. However, an AP may not know another AP's operation bandwidth, primary channel, etc. Moreover, since no association procedure between APs, no association ID (AID) may be assigned from one AP to another. In addition, AID may be used in a trigger frame to identify a triggered device.

In 802.11be, MU-RTS/CTS exchange may be used by an AP and an STA to enable the STA to start transmission and communication with another STA. Such an operation may be different than the traditional RTS/CTS and MU-RTS/CTS exchanges in terms of NAV setting and medium reservation protocols. Procedures to provide such NAV settings and medium reservation protocols (when appropriate) may be needed.

Enhanced buffer status report poll (BSRP) operation may be used by a STA to report its buffer status so that the AP may schedule its uplink transmission accordingly. Existing BSR mechanism allows a STA to report buffer status of one or all access categories. 802.11be supports traffic transmission with low latency requirement. However, traffic with low latency requirement may not have one to one mapping to the existing access categories. Thus, current BSR mechanism may not support low latency traffic transmission well.

Enhanced NDP feedback report poll operation may be discussed herein. EHT may support up to 320 MHz channel bandwidth, up to 16 spatial streams, and different puncturing patterns. The number of scheduled STAs to respond to the NFRP trigger frame, the starting spatial stream number (STARTING_SS_NUM), and the index of the assigned tone set (RU_TONE_SET_INDEX) are all functions of the bandwidth. To signal the 320 MHz channel bandwidth, a bandwidth extension field may be added. Accordingly, the equations to calculate, STARTING_SS_NUM, and RU_TONE_SET_INDEX may be updated to account for the 320 MHz bandwidth. Also, the possible different puncturing patterns may affect the effective bandwidth available for the transmission of the STAs feedback. Accordingly, the equations may be updated to account for the used puncturing pattern.

Compared to existing 802.11 standards (e.g., 802.11ax), future 802.11 (e.g., 802.11be or later) may have new features. An enhanced trigger frame may be used to trigger STAs with new features and meanwhile, backward compatible with STAs with existing features. Designs are needed to make legacy STAs to be able to operate and new STAs to understand new features when the enhanced trigger frame is used.

Because 802.11be allows preamble puncturing in an EHT TB PPDU, how to normalize the transmit power of PSRT PPDU when there are punctured subchannels may need to be specified. Normalizations of TxPwr_PSRT, PSR and RPL may be performed on a 20 MHz basis regardless of the BW field of the EHT TB PPPDU. However, the formula used to determine TxPwr_PSRT cannot be directly extended to the cases when punctured subchannels are presented in EHT Trigger frame or EHT TB-PPDU. Therefore, it is required to give an accurate definition to show the transmit power limit for a PSRT PPDU, especially when preamble puncturing exists in an EHT TB PPDU or when a Trigger frame contains punctured subchannels.

Further, there is no clear definition on how EHT STAs perform OBSS PD-based spatial reuse. In EHT operation, not only is static puncturing allowed but also dynamic puncturing (which enables additional puncturing on top of the punctured subchannels indicated by the Disallowed Subchannel Bitmap subfield in the EHT operation element) is permitted. This makes accurate measurement of the received signal strength of the PPDU more challenging. In addition, the OBSS STA may have different receiving capability from the STA that transmits the PPDU. Given these obstacles, a clear and accurate definition of how OBSS PD-based spatial reuse may be performed without interfering the OBSS STAs is desired.

With multi-AP transmission, frame exchanges between APs may be over the air. Some MAC frames may use association IDs to identify devices within a BSS. AID is an identity assigned by an AP to a STA when the STA is associated with the AP. MAP AID may enable APs to communicate each other.

A sharing AP is an AP which may be the owner of an TXOP. The sharing AP may determine to share the TXOP with other APs. In other words, the sharing AP may be an AP which may coordinate the MAP transmissions. A shared AP is an AP which may share the TXOP with a sharing AP. In other words, the shared AP may be AP which are participating AP.

MAP AID may be an AID used by the sharing AP to refer a shared AP. The MAP AID may be used the same or similar way as AID.

In one embodiment, some AID values may be reserved to identify APs. For example, AID values 2008 to 2044 and 2047 to 2094 may be reserved. A subset of these values may be used for an AP in MAP transmissions.

In one embodiment, a sharing AP may use the MAP AID to trigger transmissions from the shared APs by using the enhanced trigger frame. For example, 12 bits from the MAP AID may be used in the AID12 subfield in a User information field (e.g., EHT variant User information field) of enhanced trigger frame. Unintended STAs may check the AID12 field and notice the trigger frame may trigger a response frame from another AP.

In one embodiment, a sharing AP may assign a shared AP a MAP AID when they start negotiation of the MAP transmissions. In one embodiment, the MAP AID may have a lifetime which may be predetermined in the system or assigned by the sharing AP. When the lifetime is reached, the MAP AID value may be free to be assigned to other APs without any teardown process. In one embodiment, a MAP teardown procedure may be defined, and an assigned/used MAP AID may be set to free by using the MAP teardown procedure.

In one embodiment, one or more special AID values may be used to refer the receivers may be an AP and the frame exchange may be between APs. For example, when one or more special AID values are present in the User information field of an enhanced trigger frame, the intended receiver of the User information field may be an AP and the AP may use the resource allocated in the User information field to transmit back the sharing AP.

In one embodiment, explicit MAP Indication may be carried in common information field and/or special User information field and/or User information field of enhanced Trigger frame, so that intended and unintended STAs may notice the upcoming trigger-based transmission may involve a transmission from an AP. In one example, a new value of Trigger Type subfield may be used to indicate MAP Trigger. Alternatively (or additionally), the presence of MAP AID in a special User information field and/or User information field may be used as implicit indication for MAP Trigger.

Embodiments for Operating Channel information in a MAP Trigger frame are described herein. A subset of BSS level information may be included in the MAP Trigger frame. Examples of the subset of BSS level information may include, but are not limited to, primary channel which may indicate the location of primary 20 MHz channel, primary 40 MHz channel, primary 80 MHz channel, primary 160 MHz channel, and Channel Center Frequency Segment.

This information may help other APs and OBSS STAs to locate the primary 20 MHz channel, primary 40 MHz channel and primary 80 MHz channel, etc. of the transmitting AP. The information may be carried in Trigger Dependent common information field or Trigger Dependent User information field if MAP Trigger is defined as a new Trigger Type. Alternatively, or additionally, the information may be carried in a newly added special User information field identified by AID12=x, where x is a predefined value.

In 802.11ax, an RU allocation subfield in user information field of Trigger frame may indicate whether the CTS frame is transmitted on the primary 20 MHz channel, primary 40 MHZ channel, primary 80 MHz channel, 160 MHz channel, or 80+80 MHz channel.

In 802.11be, the RU allocation subfield may be modified to support CTS transmissions on primary 160 MHz or 320 MHz channel. Several new values of RU allocation subfield may be used to indicate them: (1) X1 if the primary 80 MHz channel is the only 80 MHz channel or the lowest frequency 80 MHz channel in the primary 160 MHz channel; (2) X2 if the primary 80 MHz channel is the second lowest frequency 80 MHz channel in the primary 160 MHz channel; (3) X3 if the primary 160 MHz channel is the only 160 MHz channel or the lowest frequency 160 MHZ channel in the 320 MHz channel; (4) X4 if the primary 160 MHz channel is the second lowest frequency 160 MHz channel in the 320 MHz channel; and/or (5) X5 if the 320 MHz channel.

In 802.11be, the RU allocation subfield may be redesigned to allow CTS frame transmission over non-primary channel.

In one embodiment, with SST, A-PPDU, A-MAP transmissions, a STA/AP may be allowed to transmit TB PPDU in non-primary channels. In one embodiment, an enhanced MU-RTS Trigger frame to trigger CTS or enhanced CTS transmissions with SST or A-PPDU or MAP transmissions may have explicit or implicit indication in the enhanced Trigger frame. Here the indication may be an implicit indication which may indicate the TB PPDU may be with SST, A-PPDU, or MAP transmissions. Alternatively, or additionally, the indication may be an explicit indication which enable the enhanced MU-RTS to trigger CTS transmissions on both primary and non-primary subchannels. A STA/AP which receives the enhanced MU-RTS Trigger frame may know the RU allocation subfield may allocate CTS transmissions over primary and/or non-primary subchannels.

The RU allocation subfield may be modified using one or more embodiments described below.

In one example, a table and each entry may define a possible resource allocation for CTS transmission. For example, the CTS transmission may be with bandwidth equal to or greater than 20 MHz, then each entry in the table may allocate a subchannel with at least 20 MHz bandwidth.

In another example, the RU allocation table defined for enhanced Trigger frame may be used, but intended/receiving STA may interpret the RU allocation slightly different. For example, if a 242-tone RU is allocation, the STA may be allowed to transmit a CTS frame on the subchannel corresponding to the 242-tone RU.

An AP may use a MU-RTS to solicit a single STA and let the STA share the TXOP to communicate with the AP or another STA. Such a MU-RTS frame may be referred to as MU-RTS TXS (TXOP sharing) frame. The AP may send a MU-RTS TXS frame or another TXS frame to solicit one or more STAs, such as sharing APs, or sharing non-AP STA to share the TXOP. The MU-RTS TXS frame or other TXS frame may include an indication that the frame or MU-RTS frame is a MU-RTS TXS frame or TXS frame. In one example, the MU-RTS frame is addressed to one particular STA if the MU-RTS TXS is used to solicit the STA to share the TXOP.

In another example, the MU-RTS frame or TXS frame may be addressed to the broadcast address, or addressed to another ID, such as the BSSID. The MU-RTS TXS frame or frame may include one User information field in its frame body. The MU-RTS TXS frame or TXS frame may include two user information field in its frame body, one of which is the special user information field, which may be used to indicate the MU-RTS TXS is meant to trigger EHT PPDUs. The MU-RTS frame may also be used by an AP to share the TXOP with one or more APs. The MU-RTS TXS frame may also contain indication that it is a frame that is used to start shared TXOP. The MU-RTS frame or other frame may include different indication whether the frame is used to start shared TXOP with an AP, or with a non-STA, or with one or more APs, or one or more non-STA APs, or within a Multiple AP set (MAP). The MU-RTS TXS frame or TXS frame may include an indication for the duration of the shared TXOP granted to the one or more STAs. Alternatively or additionally, the MU-RTS TXS or TXS frame may include a sharing schedule for the one or more STAs, indicating the allocated duration of shared TXOP and/or starting time (or implicit starting time) of the shared TXOP for each of the one or more STAs.

If a STA receives a MU-RTS TXS frame, or a TXS frame, which may include indication that the frame is used to start shared TXOP or if the MU-RTS TXS or TXS frame includes only one user information field in its frame body, or if the MU-RTS TXS or TXS frame includes only two User Info field in its frame body (one of which is the special User Info field), and the frame is not addressed to it or the frame doesn't include a User info field which may be associated with the STA (such as it includes the AID12 or other identifier of the STA), it may not reset the NAV that is updated by the MU-RTS Trigger frame if no PHY-RXSTART.indication primitive is received from the PHY during a period with a duration of 2×aSIFSTime+CTS_Time+aRxPHYStartDelay+2×aSlotTime starting when the MAC receives a PHY-RXEND.indication primitive corresponding to the detection of the MU-RTS TXS Trigger frame if the STA has used the MU-RTS TXS or TXS frame as the most recent basis to update its NAV.

In another example, if a STA receives a MU-RTS TXS frame, or a TXS frame, which may include indication that the frame is used to start shared TXOP or if the MU-RTS TXS or TXS frame includes only one User Info field in its frame body or if the MU-RTS TXS or TXS frame includes only two User Info field in its frame body (one of which is the special User Info field), and the frame is not addressed to it or the frame doesn't include a User info field which may be associated with the STA (such as it includes the AID12 or other identifier of the STA), it may not reset the NAV that is updated by the MU-RTS TXS or TXS frame if no PHY-RXSTART.indication primitive is received from the PHY during a period with a duration of aSIFSTime+aRxPHYStartDelay+2×aSlotTime starting when the MAC receives a PHY-RXEND.indication primitive corresponding to the detection of the MU-RTS TXS or TXS frame if the STA has used the MU-RTS TXS or TXS frame as the most recent basis to update its NAV.

If a STA receives a MU-RTS TXS frame, or a TXS frame, which may include indication that the frame is used to start shared TXOP or if the MU-RTS TXS or TXS frame includes only one User Info field in its frame body, which may not be the special User Info field, and the frame is addressed to it or the frame include a User info field which may be associated with the STA (such as it includes the AID12 or other identifier of the STA), it may respond to the MU-RTS TXS or TXS frame with a CTS frame or CTS TXS frame. The STA may transmit the CTS or CTS TXS frame on the indicated RU as included in the MU-RTS TXS or TXS frame. The STA may then continue to share the TXOP by transmitting frames to the AP in the uplink, or to one or more STAs, for example, to a peer non-AP STA, or to one or more APs, for example, APs within the same MAP set as the AP with which the STA is associated, such as by providing feedback for channel measurement, reporting interference, or sending data and management frames. After the STA or AP has completed its exchanges within the shared TXOP, it may transmit a CF-End frame to truncate the shared TXOP provided that there is sufficient duration remaining in the granted shared TXOP to transmit a CF-End frame. The CF-End may include indication that the CF-end frame is to truncate a shared TXOP. The RA address may be set to the broadcast address or set to the MAC Address of the sharing AP. The BSSID field may be set to the MAC address of the sharing AP or AP MLD, or set to the address of the transmitting STA.

After the sharing AP that has solicited sharing TXOP after sending a MU-RTS TXS frame or a TXS frame and within the duration of granted shared TXOP, if the AP receives a CF-End frame, for example, from the STA which is sharing the TXOP, or a CF-End frame that is carried in an intra-BSS PPDU, or a CF-End frame that may be identified to be from the same BSS, the AP may transmit another CF-End frame to announce that the shared TXOP is over and reset the NAV for its BSS.

After the sharing AP that has solicited sharing TXOP after sending a MU-RTS TXS frame or a TXS frame and within the duration of granted shared TXOP, the AP may send a CF-End frame if it has not received a response frame from one or more of the intended recipient STAs of the MU-RTS frame or TXS frame.

After the sharing AP that has solicited sharing TXOP after sending a MU-RTS TXS frame or a TXS frame and within the duration of granted shared TXOP, the AP may send a CF-End frame if no PHYRXSTART.indication primitive is received from the PHY during a period with a duration of 2×aSIFSTime+aRxPHYStartDelay+CTS-Time+2×aSlotTime starting at the of the transmitted MU-RTS TXS or TXS frame. In another example, after the sharing AP that has solicited sharing TXOP after sending a MU-RTS TXS frame or a TXS frame and within the duration of granted shared TXOP, the AP may send a CF-End frame if no PHYRXSTART.indication primitive is received from the PHY during a period with a duration of aSIFSTime+aRxPHYStartDelay+2×aSlotTime starting at the end of the MU-RTS TXS or TXS frame. After the sharing AP that has solicited sharing TXOP after sending a MU-RTS TXS frame or a TXS frame and within the duration of granted shared TXOP, if the AP receives a CF-End frame, for example, from the STA which is sharing the TXOP, or a CF-End frame that is carried in an intra-BSS PPDU, or a CF-End frame that may be identified to be from the same BSS, the AP may transmit another MU-RTS TXS or TXS frame to one or more STAs to share the remaining TXOP with one or more STAs or APs.

The term sharing AP may refer to an AP that solicits other STAs or APs to share one or more TXOPs that the AP obtained. Other terms may be used to indicate the same AP.

Buffer status report normally is sent in uplink to help its associated AP to allocate UL resources. With solicited BSR, an AP may send a BSRP Trigger frame to explicitly solicit the BSR from a STA. With unsolicited BSR, a non-AP STA may send BSR to an AP through QoS control field or BSR control subfield. In this embodiment, a modified/enhanced BSR may be used to carry low latency traffic buffer report.

A non-AP STA may set the modified/enhanced BSR support subfield in EHT (or future version) Capabilities element to 1 if it supports modified/enhanced BSR Trigger reception and/or modified/enhanced BSR transmission.

An AP STA may set the modified/enhanced BSR support subfield in EHT (or future version) Capabilities element to 1 if it supports modified/enhanced BSR Trigger transmission and/or modified/enhanced BSR reception.

In one embodiment, low latency traffic may be corresponding to multiple TIDs. Enhanced BSRP Trigger frame may be used to solicit buffer status report for one or more TIDs. A TID bitmap may be included in the Enhanced BSRP frame. The size of TID bitmap may be the number of valid TIDs defined in the system. For example, it may be 8 bit or 16 bit long. A 1 in the bitmap may indicate the buffer status corresponding to that TID is solicited. In one embodiment, the TID bitmap may be included in the Trigger Dependent common Info field. In one embodiment, the TID bitmap may be included in the Trigger Dependent User Info field.

STAs which are solicited by the Enhanced BSRP Trigger frame may respond with existing BSR control field or an enhanced BSR control field.

Figure 8:
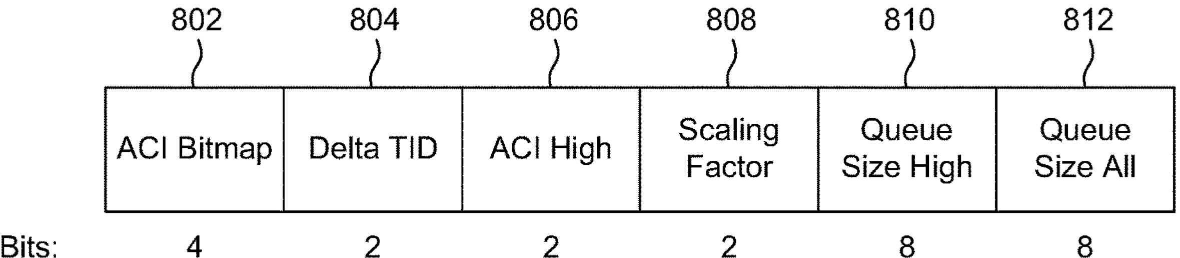
FIG. 8 is a diagram illustrating an example buffer status report (BSR) control field in an A-control field.

FIG. 8 is a diagram illustrating an example Buffer Status Report (BSR) control field in an A-control field. The BSR control field may include a ACI bitmap subfield 802, Delta TID subfield 804, ACI high subfield 806, scaling factor subfield 808, queue size high subfield 810, and queue size all subfield 812. The ACI bitmap subfield 802 may be 4 bits. The Delta TID subfield 804 may be 2 bits. The ACI high subfield 806 may be 2 bits. The scaling factor subfield 808 may be 2 bits. The queue size high subfield 810 may be 8 bits. The queue size all subfield 812 may be 8 bits.

With existing BSR control field, one or more subfields may have new meaning. As shown in FIG. 8, highlighted subfields (i.e. ACI Bitmap, Delta TID, and Queue Size All subfields) may have new meaning. A special value combination of ACI Bitmap subfield and Delta TID subfield may be used to indicate the buffer status of all TIDs related to the low latency traffic and/or TIDs indicated in TID bitmap carried in trigger frame may be included in the BSR report. For example, ACI Bitmap subfield are all 0 and Delta TID subfield is a value between 0 and 2 may be used to indicate the buffer status of low latency traffic and/or TIDs indicated in TID bitmap carried in trigger frame may be included in the BSR report. In one embodiment, STAs may report the total queue size of the low latency TIDs and/or requested TIDs by using Queue Size All subfield. It is noted that the embodiment mentioned herein may be used for solicited and unsolicited BSR for low latency traffic.

With an enhanced BSR control field, a new control ID value may be used to identify the enhanced BSR control field. In one embodiment, STAs may report the queue size states of multiple TIDs. In one embodiment with solicited BSR, the STAs may report the queue sizes of TIDs requested in the BSRP Trigger frame. In one embodiment, the STAs may report the queue sizes of TIDs related to low latency traffic. In one embodiment, the STAs may report the queue sizes of TIDs they intend to report. In one embodiment, the enhanced BSR control field may carry one or more subfields such as a TID bitmap, Scaling Factor, TID high, Queue Size High, Queue Size Low Latency, Queue Size All, Per TID Queue Size or the like as below.

In the TID bitmap, the bitmap size M may be equal to the number of valid/supported TIDs in the system. For example, 8 bit or 16 bit long. This subfield may be used to indicate the TIDs which buffer status reports are included.

The Scaling Factor subfield may indicate the unit SF, in octets, of Queue Size High, Queue Size Low Latency, Per TID Queue Size and Queue Size All. The encoding of this subfield may be defined explicitly, which may or may not be the same encoding table as defined in 802.11ax.

The TID high subfield may indicate the TID index for which the queue size is indicated in the Queue Size High subfield. The Queue Size High subfield may indicate the queue size corresponding to TID high. The Queue Size Low Latency subfield may indicate the total queue size for low latency traffic. The Queue Size All subfield may indicate the total queue size.

The Per TID Queue Size subfield may carry N TID Queue Size subfields, and each may carry queue size for a single TID. In one embodiment, N may be equal to M, the number of valid/supported TIDs in the system. In one embodiment, N may be the total number of 1s in TID bitmap.

The punctured channels may be indicated in the enhanced NFRP trigger frame in different ways. In one example, the punctured channels may be signaled using the 16 reserved bits (B12-B20 and B25-B31) in the User information field of the NFRP trigger frame:

In one embodiment, the punctured channels may be indicated as a 4-bit bitmap that tells which 20 MHz channel is punctured in the corresponding 80 MHz subblock. For 320 MHZ bandwidth, a maximum of 16 bits are required.

In another embodiment, a 3-bit lookup table would be used to indicate the puncturing patterns in each 80 MHz subblock. In one example, 7 puncturing patterns may be allowed 0111, 1011, 1101, 1110, 0011, 1100, 1001 which may fit in a 3-bits lookup table (i.e., Table 2). Here, 12 bits may be used from the 16 reserved bits in user information field of the enhanced NFRP trigger frame.

In another example, the punctured channels may be signaled in the trigger dependent common information subfield in the special User information field using either the method 1 or the method 2 explained above.

In another example, the punctured channels may be signaled in the trigger dependent user information subfield in the common information field using either of the embodiments described above.

In another example, the punctured channels may be signaled in the 3 reserved bits of the special user information field (B37-B39). In this embodiment, a 3-bits lookup table may be used to signal the puncturing pattern for the 80 MHz corresponding to the NFRP trigger frame carrying this special user information field. An NFRP trigger frame may be sent for each 80 MHZ subblock. In this method, different NFRP Trigger frames may be sent through different 80 MHz subblock.

TABLE 2

The 3-bits Lookup Table to Indicate the Puncturing Pattern in the Trigger Frame

| Entry | Puncturing Pattern |
|---|---|
| 000 | Reserved |
| 001 | 0111 |
| 010 | 1011 |
| 011 | 1101 |
| 100 | 1110 |
| 101 | 0011 |
| 110 | 1001 |
| 111 | 1100 |

In 802.11ax, several equations characterizing the non-AP STAs behavior to the NFRP trigger frame are functions of the UL bandwidth indication in the common information field. These equations may include the number of scheduled STAs to respond to the NFRP trigger, the starting spatial stream number, and the index of the assigned tone set.

$$N_{STA} = 18 \times 2^{BW} \times (MultiplexingFlag + 1)$$

$$\text{STARTING\_STS\_NUM} = \lfloor (\text{AID} - \text{Starting AID})/18/2^{BW} \rfloor$$

$$\text{RU\_TONE\_SET\_INDEX} = 1 + ((\text{AID} - \text{Starting AID}) \bmod (18 \times 2^{BW}))$$

An enhanced NFRP Trigger frame may be used to trigger NDP feedback from EHT STAs. The UL bandwidth subfield may only signal a bandwidth of up to 160 MHz and a bandwidth extension subfield is proposed in the special User information field to signal 320 MHz. The above equations used by STAs which may response with EHT NDP feedback may be modified to include the 320 MHz bandwidth as follows:

Conditioned on the uplink bandwidth extension subfield (BWE values are given in column 3 Table 3)

$$N_{STA} = \begin{cases} 18 \times 2^{BW} \times (MultiplexingFlag + 1), & BWE \le 1 \\ 18 \times 2^{BW+1} \times (MultiplexingFlag + 1), & BWE > 1 \end{cases}$$

$$\text{STARTING\_SS\_NUM} = \begin{cases} \lfloor (\text{AID} - \text{Starting AID})/(18 \times 2^{BW}) \rfloor, & BWE \le 1 \\ \lfloor (\text{AID} - \text{Starting AID})/(18 \times 2^{BW+1}) \rfloor, & BWE > 1 \end{cases}$$

$$\text{RU\_TONE\_SET\_INDEX} = \begin{cases} 1 + ((\text{AID} - \text{Starting AID}) \bmod (18 \times 2^{BW})), & BWE \le 1 \\ 1 + ((\text{AID} - \text{Starting AID}) \bmod (18 \times 2^{BW+1})), & BWE > 1 \end{cases}$$

Conditioned on both the uplink bandwidth and the uplink bandwidth extension subfields $$N_{STA} = \begin{cases} 18 \times 2^{BW+1} \times (MultiplexingFlag + 1), & BW = 3 \text{ and } BWE > 1 \\ 18 \times 2^{BW} \times (MultiplexingFlag + 1), & \text{otherwise} \end{cases}$$

$$\text{STARTING\_SS\_NUM} = \begin{cases} \lfloor (AID - \text{Starting } AID)/(18 \times 2^{BW+1}) \rfloor, & BW = 3 \text{ and } BWE > 1 \\ \lfloor (AID - \text{Starting } AID)/(18 \times 2^{BW}) \rfloor, & \text{otherwise} \end{cases}$$

$$\text{RU\_TONE\_SET\_INDEX} = \begin{cases} 1 + ((AID - \text{Starting } AID) \bmod (18 \times 2^{BW+1})), & BW = 3 \text{ and } BWE > 1 \\ 1 + ((AID - \text{Starting } AID) \bmod (18 \times 2^{BW})), & \text{otherwise} \end{cases}$$

TABLE 3

| Existing UL BW and UL WB Extension Table | | | |
|---|---|---|---|
| UL BW (2 bits) | Bandwidth for HE TB PPDU, MHz | UL BW Extension (2 bits) | Bandwidth for EHT TB PPDU, MHz |
| 0 | 20 | 0 | 20 |
| 0 | 20 | 1 | reserved |
| 0 | 20 | 2 | reserved |
| 0 | 20 | 3 | reserved |
| 1 | 40 | 0 | 40 |
| 1 | 40 | 1 | reserved |
| 1 | 40 | 2 | reserved |
| 1 | 40 | 3 | reserved |
| 2 | 80 | 0 | 80 |
| 2 | 80 | 1 | reserved |
| 2 | 80 | 2 | reserved |
| 2 | 80 | 3 | reserved |
| 3 | 160 | 0 | reserved |
| 3 | 160 | 1 | 160 |
| 3 | 160 | 2 | 320-1 |
| 3 | 160 | 3 | 320-2 |

In a case of puncturing, the above equations may be updated to account for the punctured channels. Herein, the effective bandwidth may refer to the total utilized bandwidth (i.e., bandwidth minus the punctured channel bandwidth).

Considering the 4-bits bitmap method, a puncturing pattern over 80 MHz channel may be indicated as a sequence of bits ($b_1b_2b_3b_4$) where $b_1$ applies to the lowest frequency 20 MHZ channel and $b_4$ applies to the highest frequency 20 MHz channel. A value of 0 for a bit may indicate that the corresponding 20 MHz channel is punctured and a value of 1 may be used otherwise. In the lookup table method, a sequence of 3 bits may indicate a certain entry in the lookup Table 3. Similarly, the corresponding puncturing pattern corresponding to the 3-bits entry may be indicated as a 4-bits puncturing pattern ($b_1b_2b_3b_4$).

The number of non-punctured channels in the $j^{th}$ 80 MHz subblock $$N_{20}^{j}$$

may be counted by simply counting the ones in each sequence.

$$N_{20}^{j} = \sum_{i=1}^{4} b_i$$

The total effective bandwidth (non-punctured channels) for the entire bandwidth may be then expressed as:

$$N_{20} = \sum_{j} N_{20}^{j}$$

Accordingly, the enhanced NFRP trigger frame equations may be rewritten as:

$$N_{STA} = 18 \times N_{20} \times (MultiplexingFlag + 1)$$

$$\text{STARTING\_SS\_NUM} = \lfloor (AID - \text{Starting } AID)/(18 \times N_{20}) \rfloor$$

For the RU_TONE_SET_INDEX, the non-puncturing case index may be computed and then mapped to the puncturing case index for each 80 MHz as follows:

TABLE 4

| Non-puncturing Case Index Mapped to the Puncturing Case Index for each 80 MHZ | |
|---|---|
| Puncturing Pattern | RU_TONE_SET_INDEX in the puncturing mode |
| 0111 | RU_TONE_SET_INDEX_PUNCTURED = RU_TONE_SET_INDEX + 18 |
| 1011 | RU_TONE_SET_INDEX_PUNCTURED = $\begin{cases} \text{RU\_TONE\_SET\_INDEX}, & \text{RU\_TONE\_SET\_INDEX} \leq 18 \\ \text{RU\_TONE\_SET\_INDEX} + 18, & \text{otherwise} \end{cases}$ |
| 1101 | RU_TONE_SET_INDEX_PUNCTURED = $\begin{cases} \text{RU\_TONE\_SET\_INDEX}, & \text{RU\_TONE\_SET\_INDEX} \leq 36 \\ \text{RU\_TONE\_SET\_INDEX} + 18, & \text{otherwise} \end{cases}$ |
| 1110 | RU_TONE_SET_INDEX_PUNCTURED = RU_TONE_SET_INDEX |
| 0011 | RU_TONE_SET_INDEX_PUNCTURED = RU_TONE_SET_INDEX + 36 |
| 1001 | RU_TONE_SET_INDEX_PUNCTURED = $\begin{cases} \text{RU\_TONE\_SET\_INDEX}, & \text{RU\_TONE\_SET\_INDEX} \leq 18 \\ \text{RU\_TONE\_SET\_INDEX} + 36, & \text{otherwise} \end{cases}$ |
| 1100 | RU_TONE_SET_INDEX_PUNCTURED = RU_TONE_SET_INDEX |

In an A-PPDU case, the effective bandwidth may refer to the effective bandwidth used by a type of TB PPDU. For example, the AP may acquire 320 MHz channel, and allocate the primary 160 MHz for HE TB PPDU transmissions and the secondary 160 MHz for EHT TB PPDU transmissions. An enhanced NFRP Trigger frame may be used to trigger both HE TB PPDU and EHT TB PPDU. For EHT transmissions on the secondary 160 MHz channel, the effective bandwidth may refer to bandwidth up to 160 MHz depending on preamble puncture scenarios.

802.11be has two releases, R1 and R2. R1 carries baseline feature and R2 carries advanced feature. R2 feature related information may be carried in an Enhanced Trigger frame, and/or an EHT TB PPDU.

R1/R2 indication bit may be carried in the Enhanced Trigger frame. In one embodiment, the R1/R2 bit may be carried in the common information field of the Enhanced Trigger frame. In one embodiment, the R1/R2 bit may be carried in the special User information field. For example, the special User information field with AID12=2007. In one embodiment, the R1/R2 bit may be carried in User information field so that a single Trigger frame may be used to trigger users with and without R2 feature. In one embodiment, the R1/R2 bit may be reserved in 11be release 1 with a fixed value.

In one embodiment, an EHT TB PPDU for R2 may not be the same as that for R1. For example, the U-SIG field of EHT TB PPDU for R1 and R2 may carry different subfields. In this case, the intended receivers of the Trigger frame may need to know the TB PPDU format to respond. Together with existing HE/EHT P160 subfield in common information field and PS160 subfield in User information field of Trigger frame, a STA may determine the TB PPDU format using Table 5 below. In this table, the first three columns show the different combination of the three subfields. TB PPDU column may indicate the type of TB PPDU used for response. STA Capability column may indicate the STA capability to support 11ax, 11be release 1 and/or 11be release 2. The intended STA may need to indicate the capability in association stage. An AP may need to know the capability of each intended STA before it transmits Trigger frame to the STA. Base on the STA capability, the AP may set the HE/EHT P160 subfield, PS160 subfield and R1/R2 subfield.

TABLE 5

Using Three Bits in a Trigger Frame to Determine the Responding TB PPDU Format

| HE/EHT P160 (B54) | PS160 (B39) | R1/R2 | TB PPDU | Comments | STA Capability |
|---|---|---|---|---|---|
| 1 | 0 | 1/reserved value | HE | STA in P160 responds with HE TB PPDU | 11ax |
| 1 | 1 | 1/reserved value | EHT R1 | STA in S160 responds with EHT TB PPDU with R1 features | 11be R1 |
| 1 | 1 | 0/new value | EHT R2 | STA in S160 responds with EHT TB PPDU with R2 features | 11be R2 |
| 0 | 0 | 1/reserved value | EHT R1 | STA in P160 responds with EHT TB PPDU with R1 features | 11be R1 |
| 0 | 0 | 0/new value | EHT R2 | STA in P160 responds with EHT TB PPDU with R2 features | 11be R2 |
| 0 | 1 | 1/reserved value | EHT R1 | (P160 = EHT & STA in S160)→ EHT TB PPDU | 11be R1 |
| 0 | 1 | 0/new value | EHT R2 | (P160 = EHT & STA in S160)→ EHT TB PPDU | 11be R2 |

In one embodiment, an EHT TB PPDU for R2 may be the same as that for R1. For example, the U-SIG field of EHT TB PPDU for R1 and R2 may carry the same subfields. A trigger frame may carry more information for R2. In one embodiment, some reserved fields in common information field, special User information field with AID=2007, and User information field may carry R2 related features. In one embodiment, one or more special User information field may be defined to carry R2 related features. The special User information field may be identified by a special AID value and/or R1/R2 subfield disclosed. For example, if R1/R2 subfield may be set to a non-reserved value, a 11be R2 capable STA may expect the presence of the R2 related special User information field, and/or reserved bits in R1 may have meaning in R2. In one embodiment, the R1/R2 bit may be carried in the first special User information field with AID=2007.

Aggregated PPDU (A-PPDU) transmission, which allows different type of PPDUs aggregated in frequency domain, may be supported in 802.11be. For example, an AP may acquire a 320 MHz channel, and it may allocate 160 MHz subchannel for HE PPDU transmissions and the other 160 MHz subchannel for EHT PPDU transmissions. With trigger-based UL A-PPDU transmission, one Trigger frame may be used to trigger multiple types of PPDUs in UL. It is noted that the Trigger frame may carry information for both type of PPDUs.

In one embodiment, an A-PPDU subfield may be explicitly signaled in a Trigger frame. The subfield may be in common information field, special User information field or User information field. The field that may be used to indicate the triggered transmission may use A-PPDU format. In one embodiment, a combination of bits in common information field, special User information field and/or User information field may be used together to indicate the presence of A-PPDU.

Embodiments for Parametrized Spatial Reuse (PSR) for EHT PPDU are described herein. The described embodiment may be used in PSR for HE PPDU or any other PPDU which has PSR operation.

The intended transmit power of EHT Parameterized Spatial Reuse Transmission (PSRT) PPDU is as below with the following values:

$$TX_{PWR_{PSRT}} - 10\log_{10}\left(\frac{eBW_{PSRT}}{20\text{ MHz}}\right) \le f(ESR1, ESR2) - \left(RPL - 10\log_{10}\left(\frac{eBW_{PSRR}}{20\text{ MHz}}\right)\right) \text{ [dBm]}$$

$TX_{PWR_{PSRT}}$ is the transmit power of PSRT PPDU over the Parameterized Spatial Reuse Reception (PSRR) PPDU bandwidth (BW), $ESR_i$, i=1 or 2, is the PSR subfield in the U-SIG of TB PPDU or the PSR subfield in the special User information field of EHT Trigger frame. Received Power Level (RPL) in dBm may be obtained at the OBSS STA that may transmit PSRT PPDU by measuring the combined received power at the receive antenna connector over the whole PSRR PPDU bandwidth or the bandwidth that PSRR PPDU channel and PSRT PPDU channel overlaps, during the non-High Efficiency (non-HE) portion of the PPDU preamble of the triggering PPDU, averaged over all antennas used to receive the PPDU. $eBW_{PSRT}$ and $eBW_{PSRR}$ are effective bandwidths in MHz of PSRT PPDU and PSRR PPDU, respectively, with un-punctured subchannels only. Their value may be obtained in Table 7 and Table 8 as $BW_{Effective}$. $eBW_{PSRR}$ may also be the effective bandwidth of the intersection of PSRT PPDU and PSRR PPDU channels with un-punctured subchannels. $eBW_{PSRR}$ may be carried in a trigger frame. f(ESR1, ESR2) is a function of ESR1 and ESR2. For example, one option may be f(ESR1, ESR2)=min (ESR1, ESR2); or $$f(ESR1, ESR2) = 10 * \log10\left(\text{average}\left(10^{\frac{ESR1}{10}}, 10^{\frac{ESR1}{10}}\right)\right) \text{ or}$$

$$TX_{PWR_{PSRT}} - 10\log_{10}\left(\frac{eBW_{PSRT}}{20\text{ MHz}}\right) \le f(ESR1, ESR2) - RPL_{20\,MHz},$$

where $RPL_{20MHz}$ is the received signal power at the receive antenna connector in dBm/20 MHz, the average of the power received in non-punctured 20 MHz subchannels within the overlapping bandwidth of the PSRR PPDU and the PSRT PPDU.

In one embodiment, the transmit power of PSRT PPDU, $TX_{PWR_{PSRT}}$, may be determined by the following equation:

$$TX_{PWR_{PSRT}} \le f(ESR1', ESR2') - RPL_{PSRT} + 10\log_{10}\alpha + 10\log_{10}\left(\frac{BW_{PSRR}}{20\text{ MHz}}\right) + 10\log_{10}\left(\frac{eBW_{PSRT}}{20\text{ MHz}}\right) \text{ [dBm]}$$

where $RPL_{PSRT}$ is the total received power level measured over PSRT PPDU channel bandwidth at the STA that would transmit PSRT PPDU or $RPL_{PSRT}$ represents the total received power level measured over STA operating channel overlapped with PSRR PPDU; $BW_{PSRR}$ is the PSRR PPDU bandwidth; ESR1', ESR2' are the ESR values based on the ratio, $$10\log_{10}\frac{eBW_{PSRR}}{BW_{PSRR}}.$$

$$\alpha = \frac{eBW_{STA-PSRR}}{eBW_{PSRR}},$$

where $eBW_{STA\text{-}PSRR}$ is the effective channel bandwidth of non-punctured subchannels in PSRR PPDU transmission channel that overlaps with PSRT PPDU transmission channel or it represents the effective channel bandwidth of STA operating channel that overlaps with PSRR PPDU with non-punctured subchannels only. α may be computed at OBSS STA which transmits PSRT PPDU if the detailed puncturing information, or coarse puncturing information (e.g., indication of existence of puncturing per 40 or per 80 MHz subblock) is available in the trigger frame in PSRR PPDU. $eBW_{PSRT}$ is the effective bandwidth of PSRT PPDU, which include non-punctured subchannels only. For example, the total BW of PSRT or PSRR PPDU is 80 MHz. It includes one punctured 20 MHz subchannel. Then the effective bandwidth of PSRT or PSRR PPDU is 60 MHz.

Table 6 below shows an example, in which each PSR value in the first column may mean different ESR value used for computing the $TX_{PWR_{PSRT}}$ upper bound, depending on the value of $$10\log_{10}\frac{eBW_{PSRR}}{BW_{PSRR}}.$$

The possible value of $$10\log_{10}\frac{eBW_{PSRR}}{BW_{PSRR}}$$

(shown as 0, −1.2 and −3.0 in Table 6) may need to be signaled in the trigger frame carried in PSRR PPDU so that an OBSS STA may decode the PSR value with proper ESP value indicated in the last three columns of Table 6. As shown in in Table 6, such a signaling may need 2 bits in the trigger frame. For example, we may add EBW Ratio subfield in common information field or special user information field or user information field of the trigger frame. EBW Ratio field is set to 0 may indicate $$10\log_{10}\frac{eBW_{PSRR}}{BW_{PSRR}} = 0.$$

EBW Ratio field is set to 1 may indicate $$10\log_{10}\frac{eBW_{PSRR}}{BW_{PSRR}} = -1.2.$$

EBW Ratio field is set to 2 may indicate $$10\log_{10}\frac{eBW_{PSRR}}{BW_{PSRR}} = -3.0.$$

TABLE 6

EHT Spatial Reuse (ESR) Field Encoding

| PSR Value | $10\log_{10}\frac{eBW_{PSRR}}{BW_{PSRR}}$: 0 | −1.2 | −3.0 |
|---|---|---|---|
| 0 | PSR_DISALLOW | | |
| 1 | −80 | −81.2 | −83.0 |
| 2 | −74 | −75.2 | −77.0 |
| 3 | −68 | −69.2 | −71.0 |
| 4 | −62 | −63.2 | −65.0 |
| 5 | −56 | −57.2 | −59.0 |
| 6 | −50 | −51.2 | −53.0 |
| 7 | −47 | −48.2 | −50.0 |
| 8 | −44 | −45.2 | −47.0 |
| 9 | −41 | −42.2 | −44.0 |
| 10 | −38 | −39.2 | −41.0 |
| 11 | −35 | −36.2 | −38.0 |
| 12 | −32 | −33.2 | −35.0 |
| 13 | −29 | −30.2 | −32.0 |
| 14 | −26 | −27.2 | −29.0 |
| 15 | PSR_AND_NON_SRG_OBSS_PD_PROHIBITED | | |

In another embodiment, when the AP transmits the PSRR PPDU, it may calculate the PSR_INPUT by including the factor of $$10\log_{10}\frac{eBW_{PSRR}}{BW_{PSRR}},$$

$$\text{i.e., PSR\_INPUT} = \text{TX\_PWR}_{AP} + \text{Acceptable Receiver Interference Level}_{\_AP} + 10\log_{10}\frac{eBW_{PSRR}}{BW_{PSRR}}),$$

where TX_PWRAP is the total power at the antenna connector, in dBm, for that 20 MHz subchannel for a 20 MHZ, 40 MHZ, 80 MHZ, 160 MHz or 320 MHz PPDU, over all antennas used to transmit the PSRR PPDU containing the Trigger frame; Acceptable Receiver Interference Level$_{_AP}$ is a value in dBm for that 20 MHZ subchannel for a 20 MHz, 40 MHZ, 80 MHZ, 160 MHz or 320 MHz PPDU and should be set to as follows:

Let $$P_{RU}^{rx\_target}$$

be the expected receive signal power, measured at the AP's antenna connector and averaged over the antennas, for the HE portion of the HE TB PPDU transmitted on the assigned RU_indicated in the trigger frame. Let $SNR_{MCS_i}$ be the minimum SNR value that yields ≤10% PER for that the MCS for the RU. Then the Acceptable Receiver Interference Level$_{_AP}$ in dBm for the 20 MHz that the RU covers is $$\text{Acceptable Receiver Interference Level}_{AP} = \beta + \left(P_{RU}^{rx\_target} - SNR_{MCS} - \text{Margin}\right),$$

$$\text{where } \beta = 10\log_{10}(20\text{ MHz}/BW_{RU}[\text{MHz}]).$$

Then, the AP that sends the PSRR PPDU may determine the value of the UL spatial reuse subfield of the common information field of the trigger frame for each 20 MHz subchannel by selecting the row in Table 1 that has a numerical value in the $$10\log_{10}\frac{eBW_{PSRR}}{BW_{PSRR}} = 0$$

column that is the highest value that is less than or equal to the value of PSR_INPUT.

Alternatively, or additionally, the intended transmit power of EHT PSRT PPDU may be as below with the following values:

$$TX_{PWR_{PSRT}} - 10\log_{10}\left(N_s^{PSRT}\right) \le f(ESR1, ESR2) - \left(RPL - 10\log_{10}\left(N_s^{PSRR}\right)\right)\ [\text{dBm}]$$

$$N_S^{PSRT} \text{ and } N_S^{PSRR}$$

are the number of un-punctured 20 MHz subchannels in PSRT PPDU and PSRR PPDU, respectively.

$$N_s^{PSRR}$$

may also be the number of un-punctured 20 MHz subchannels in the intersection of PSRT PPDU and PSRR PPDU channels.

$$N_s^{PSRR}$$

may be carried on a Trigger frame. The exemplary definition of $$N_S^{PSRT} \text{ and } N_S^{PSRR}$$

may be shown in Table 6 and Table 7 as $N_S$. There are multiple methods to signal the number of non-punctured 20 MHz subchannels ($N_S$) or the effective bandwidth ($BW_{Effective}$).

Alternatively, or additionally, the intended transmit power of EHT PSRT PPDU may be as below with the following values:

$$TxPower_{PSRT} \leq PSR_{20MHz} - \left(RPL_{STA-PSRR} - 10\log_{10}\gamma - 10\log_{10}\frac{BW_{STA-PSRR}}{20\text{ MHz}}\right) + 10\times\log_{10}\frac{eBW_{PSRT}}{20\text{ MHz}}$$

$$\text{where } \gamma = \log_{10}\frac{eBW_{STA-PSRR}}{BW_{STA-PSRR}}.$$

$BW_{STA-PSRR}$ is the channel bandwidth of subchannels in PSRR PPDU transmission channel that overlaps with PSRT PPDU transmission channel. It may also represent the channel bandwidth of STA operating channel that overlaps with PSRR PPDU. It may include punctured subchannels. This transmit power calculation may be performed at STA side without requiring additional signaling from AP except the PSR value.

To further simplify the calculation of $TxPower_{PSRT}$, the following expression can be used to calculate the upper bound of $$TxPower_{PSRT} \leq PSR_{20MHz} - \left(RPL_{STA-PSRR} - 10\times\log_{10}\frac{BW_{STA-PSRR}}{20\text{ MHz}}\right) + C + 10\times\log_{10}\frac{eBW_{PSRT}}{20\text{ MHz}}$$

Where C is a constant, which may be predefined to represent minimum value of $10\log_{10}\gamma$ (e.g., 3 dB) or average value of $10\log_{10}\gamma$.

In one embodiment, one example of representing $N_S$ or $BW_{Effective}$ is using 4 bits to represent different BW (20 MHz to 320 MHZ) and puncturing patterns. The mapping table shown in Table 9 can be used to map different values of $N_S$ or $BW_{Effective}$ to 4 bits. It is noted that the normalization of $TX_{PWR_{PSRT}}$, ESR, RPL may be performed on 20 MHz channel basis as described above. It can be also performed on other BW value(s).

TABLE 7

Exemplary Definition of $BW_{Effective}$ or Ns in a Non-OFDMA Case

| CH_BANDWIDTH | Number of Punctured 20 MHz channels | $BW_{Effective}$ (MHz) | Ns |
|---|---|---|---|
| CBW20, HT_CBW20, NON_HT_CBW20 | 0 | 20 | 1 |
| CBW40, HT_CBW40, NON_HT_CBW40 | 0 | 40 | 2 |
| CBW80, CBW 160, CBW320 | 0 | 80, 160, 320 | 4, 8, 16 |
| CBW80 with 20 MHz puncturing (484 + 242) | 1 | 60 | 3 |
| CBW160 with 40 MHz puncturing (996 + 484) | 2 | 120 | 6 |
| CBW160 with 20 MHz puncturing (996 + 484 + 242) | 1 | 140 | 7 |
| CBW320 with 120 MHz puncturing (2*996 + 484) | 6 | 200 | 10 |
| CBW320 with 80 MHz puncturing (3*996) | 4 | 240 | 12 |
| CBW320 with 40 MHz puncturing (3*996 + 484) | 2 | 280 | 14 |

TABLE 8

Exemplary Definition of $BW_{Effective}$ or Ns in OFDMA Case

| CH_BANDWIDTH | # of Punctured 20 MHz channels | $BW_{Effective}$ (MHz) | Ns |
|---|---|---|---|
| CBW20, HT_CBW20, NON_HT_CBW20 | 0 | 20 | 1 |
| CBW40, HT_CBW40, NON_HT_CBW40 | 0 | 40 | 2 |
| One 80 MHz segment | 2 | 40 | 2 |
| One 80 MHz segment | 1 | 60 | 3 |
| One 80 MHz segment | 0 | 80 | 4 |
| Two 80 MHz segments | 3 | 100 | 5 |
| Two 80 MHz segments | 2 | 120 | 6 |
| Two 80 MHz segments | 1 | 140 | 7 |
| Two 80 MHz segment | 0 | 160 | 8 |
| Four 80 MHz segments | 7 | 180 | 9 |
| Four 80 MHz segments | 6 | 200 | 10 |
| Four 80 MHz segments | 5 | 220 | 11 |
| Four 80 MHz segments | 4 | 240 | 12 |
| Four 80 MHz segments | 3 | 260 | 13 |
| Four 80 MHz segments | 2 | 280 | 14 |
| Four 80 MHz segments | 1 | 300 | 15 |
| Four 80 MHz segments | 0 | 320 | 16 |

TABLE 9

Exemplary Mapping Table of $BW_{Effective}$ or Ns

| $BW_{Effective}$ (MHz) | Ns | Bits Mapping |
|---|---|---|
| 20 | 1 | 0000 |
| 40 | 2 | 0001 |
| 60 | 3 | 0010 |
| 80 | 4 | 0011 |
| 100 | 5 | 0100 |
| 120 | 6 | 0101 |
| 140 | 7 | 0110 |
| 160 | 8 | 0111 |
| 180 | 9 | 1000 |
| 200 | 10 | 1001 |
| 220 | 11 | 1010 |
| 240 | 12 | 1011 |
| 260 | 13 | 1100 |
| 280 | 14 | 1101 |
| 300 | 15 | 1110 |
| 320 | 16 | 1111 |

In another embodiment, the effective bandwidth may be signaled in 8-bits where each 2 bits signal the effective bandwidth of each 80 MHz subblock. The leftmost 2 bits may be mapped to the lowest 80 MHz subblock and the rightmost 2 bits may be mapped to the highest 80 MHz subblock. Table 10 shows the mapping of each 2 bits to the corresponding effective bandwidth.

TABLE 10

Bit Mapping to Effective Bandwidth

| Bit Mapping | Effective Bandwidth (MHz) |
| --- | --- |
| 00 | Reserved |
| 01 | 40 |
| 10 | 60 |
| 11 | 80 |

Accordingly, the effective bandwidth of each 80 MHz subblock $$BW^i_{effective}$$

may be read from the table by mapping the 2-bits to the corresponding effective bandwidth. The total effective bandwidth may be expressed as:

$$BW_{effective} = \sum_{j=1}^{4} BW^j_{effective}$$

In case of 20 MHz and 40 MHz channels, a sequence of all-zeros (00000000) can be used to signal this case. In one example, the sequence 11 01 00 00 may represent a 160 MHZ channel where the effective bandwidth in the first 80 MHz subblock is 11=80 MHz and in the second 80 MHz subblock is 01=40 MHz with a total effective bandwidth of 120 MHz. In another example, the sequence 00 00 00 00 may check the UL bandwidth field and the effective bandwidth may be the UL bandwidth of the common field in the trigger frame. In another example, the sequence 10 01 01 11 may represent a 320 MHz channel where the effective bandwidth in the first 80 MHz subblock is 10=60 MHz, the effective bandwidth in the second 80 MHz subblock is 01=40 MHz, the effective bandwidth in the third 80 MHz subblock is 01=40 MHz, the effective bandwidth in the forth 80 MHz subblock is 11=80 MHz and the total effective bandwidth is 220 MHz The effective bandwidth or number of non-punctured 20 MHz subchannels may be signaled in the trigger dependent common information subfield in the common field of the trigger frame or the trigger dependent user information subfield of the special user information field in the trigger frame.

In other embodiments, enhanced OBSS PD spatial reuse operation is described. These embodiments may be applied to any PPDU which performs OBSS PD based SR operation (e.g., HE STA, EHT STA or other STAs). In these embodiments, an OBSS STA may check the received signal strength level, which is measured from the L-STF fields of a PPDU or the PHY SYNC filed, shortSYNC field or Long PHY SYNC field, whichever exists and which is used to determine PHY-CCA, is below the OBSS PD level. The measured channel may be equal to the bandwidth of the to-be-transmitted PPDU. For example, if the OBSS STA would like to transmit the PPDU on an 80 MHz channel which contains subchannel 1, subchannel 2, subchannel 3 and subchannel 4, the OBSS STA may measure the received signal strength level on all these 4 subchannels. The transmitted power may be the same across the subchannels used for transmission or the transmitted power may be different from one subchannel to another subchannel.

The adjustment of OBSS PD and transmit power for EHT devices will now be described. The OBSS PD level used by an EHT device to determine whether the wireless channel is clear or not, in conjunction with the transmit power, is given by one of the following equations:

$$OBSS_{PD_{level}} \leq \max\Big(OBSS_{PDmin}, \min\Big(OBSS_{PDmax}, OBSS_{PDmin} + \big(TX_{PWR_{ref}} - TX_{PWR}\big)\Big)\Big) + \log10(\text{N\_nonpunc}) \quad \text{Equation 1}$$

Where N_nonpunc refers to the number of non-punctured subchannels within the received PPDU, or alternatively, N_nonpunc refers to the number of non-punctured subchannels within the transmitted PPDU.

In Equation 1, the transmit power or OBSS_PDlevel may be the same across the bandwidth within the received PPDU.

Alternatively, the OBSS PD level per subchannel (e.g., 20 MHz) used by an EHT device to determine whether the wireless channel is clear or not, in conjunction with the transmit power, is given by the following equation:

$$OBSS_{PD_{level,i}} \leq \max\Big(OBSS_{PDmin}, \min\Big(OBSS_{PDmax}, OBSS_{PDmin} + \big(TX_{PWR_{ref,i}} - TX_{PWR,i}\big)\Big)\Big), \quad \text{Equation 2}$$

where $OBSS_{PD_{level,i}}$ is the OBSS PD level for the ith-subchannel, $TX_{PWR_{ref,i}}$ is the TX_PWR_ref is the reference transmit power on ith-subchannel, and $TX_{PWR,i}$ is the transmitted power on the $i^{th}$-subchannel.

Equation 3, shown below, is the transmit power for the part that utilizes OBSS-PD based spatial reuse, where N_nonpunc refers to the number of non-punctured subchannels within the intersect of received the PPDU and the transmitted PPDU.

$$TX_{PWR} = \sum_{i=1}^{N\_non\_punc} TX_{PWR_i} \quad \text{Equation 3}$$

$$OBSS_{PD_{level}} \text{ is a function of } OBSS_{PD_{level,i}}, \quad \text{Equation 4}$$

Where i=1,2 . . . , is the number of subchannels within the transmitted PPDU.

$$OBSS_{PD_{level}} \text{ is a function of } OBSS_{PD_{level,i}} \quad \text{Equation 5}$$

Where i=1,2 . . . , is the number of subchannels within the intersect (or the union) of the received PPDU and the transmitted PPDU.

$$OBSS_{PD_{level}} \text{ is a function of } OBSS_{PD_{level,i}}, \quad \text{Equation 6}$$

Where i=1,2 . . . , is the number of subchannels within the received PPDU.

In Equation 2, the transmit power or OBSS_PDlevel may be different from one subchannel to another subchannel within a defined bandwidth. The total transmit power of a Tx PPDU may follow Equation. The OBSS PD level used for CCA determination is defined in Equations, 4, 5, and 6.

Figure 9:
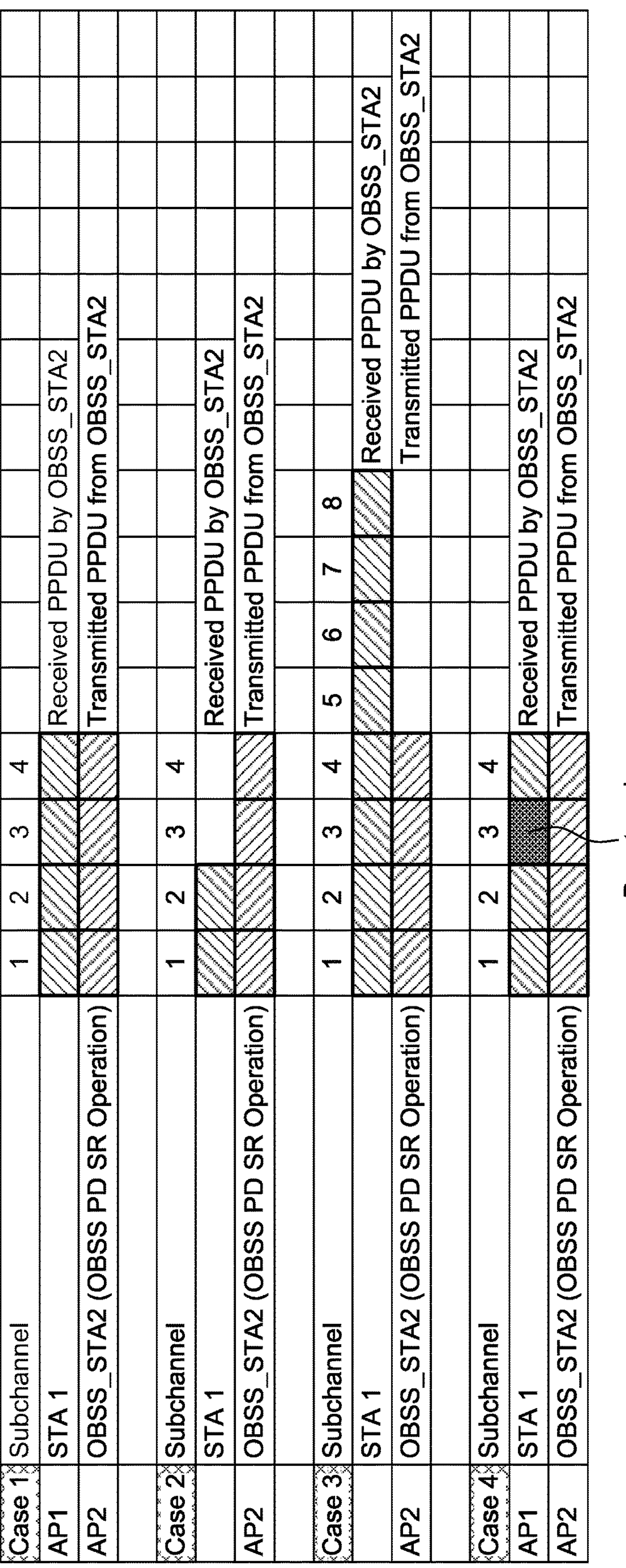
FIG. 9 is a diagram illustrating an exemplary overlapping basic service set preamble-detection (OBSS-PD) based spatial reuse operation.

FIG. 9 shows an exemplary OBSS-PD based spatial reuse operation when the transmitted PPDU is equal to 80 MHz but the bandwidth of the receiver PPDU varies. In the various cases depicted, STA1 that is associated with AP1 transmits the PPDU and allows OBSS PD based spatial reuse. The OBSS STA, STA2, which is associated with AP2, may want to perform OBSS PD based spatial reuse. Each of the four cases are described in more detail below.

In case 1 where the bandwidth of the received PPDU and the bandwidth of the transmitted PPDU are the same and OBSS_STA2 makes full use of subchannel 1-4 which are occupied by the PPDU sent from STA1, the adjustment of OBSS PD level and transmit power of OBSS_STA2 may follow Equation 1.

Case 2 indicates the PPDU which is sent by STA1 has a smaller bandwidth than the transmitted PPDU from OBSS_STA2. In this example, subchannel 1-2 are allowed to have OBSS-PD based spatial reuse and subchannel 3-4 do not use OBSS-PD based spatial reuse. The adjustment of OBSS PD level and transmit power of OBSS STA2 in subchannel 1 and/or subchannel 2 may follow Equation 2. The total transmit power of OBSS STA2 in subchannel 1 and subchannel 2 may follow Equation. The transmit power of OBSS STA2 in subchannel 3 and subchannel 4 may be different from the total transmit power of OBSS STA2 in subchannel 1 and subchannel 2. Or the transmit power of OBSS STA2 in subchannel 3 and subchannel 4 may be same as the total transmit power of OBSS STA2 in subchannel 1 and subchannel 2. The OBSS PD level for subchannel 1 and subchannel 2 may follow Equation 5 or Equation 6.

Case 3 indicates the PPDU which is sent by STA1 has larger bandwidth than the transmitted PPDU from OBSS_STA2. In this example, subchannels 1-8 are allowed to have OBSS-PD based spatial reuse. However, OBSS_STA2 can only operate up to 80 MHz channel and may use subchannel 1-4. In this example, the adjustment of OBSS PD level and transmit power of OBSS STA2 in subchannel 1 to subchannel 4 may follow Equation 1, where N_nonpunc refers to the number of non-punctured subchannels within the transmitted PPDU.

Case 4 indicates the PPDU which is sent by STA1 has the same bandwidth as the transmitted PPDU from OBSS_STA2. However, STA1 has one punctured subchannel within its transmitted PPDU, i.e., subchannel 3 is punctured. In this example, subchannel 1-4 may be allowed to use OBSS-PD based spatial reuse. The adjustment of OBSS level and the transmit power in each 20 MHz subchannel may follow Equation 2 and Equation 3 independently. If the same transmit power is applied across all 20 MHz subchannels, the total transmit power for the transmitted PPDU from OBSS_STA2 utilizing OBSS_PD based spatial reuse is based on Equation 7 below.

$$TX_{PWR} = 4TW_{PWR0},\ \text{where}\ TX_{PWR0} \leq \min(TX_{PWR\_max1}, TX_{PWR\_max2}, TX_{PWR\_max3}, TX_{PWR\_max4}). \quad \text{Equation 7}$$

The different transmit power can be applied in different-subchannels. Similarly, the different OBSS_PD level can be applied in different subchannels.

In other embodiment, OBSS PD SR transmit power may be restricted. If a STA starts an OBSS PD transmit power restriction period with a chosen OBSS_PD level on one 20 MHz subchannel, then the upper limit of the TX_PWR on the corresponding 20 MHz subchannel of the transmitted PPDU may follow Equation 8 below:

Equation 8

$$TX_{PWR\_max\_i} = \begin{cases} \text{unconstrained, if } OBSS_{PD_{level_i}} \leq OBSS_{PDmin} \\ f(\text{TX\_PWR}_{ref}) - \left(OBSS_{PD_{level_i}} - OBSS_{PDmin}\right), \text{ if } OBSS_{PDmax} \geq, \\ OBSS_{PDlevel_i} > OBSS_{PDmin} \end{cases}$$

where i=1, 2, . . . number of non-punctured subchannels of the transmitted PPDU.

The actual transmit power of the STA over the transmitted PPDU may follow Equation 9 or Equation 10 below:

$$TX_{PWR} \leq N_{nonpunc} * \min\left(TX_{PWR_{max,1}}, TX_{PWR_{max,2}}, \ldots, TX_{PWR_{max,N\_nonpunc}}\right) \quad \text{Equation 9}$$

Where N_nonpunc is the number of non-punctured subchannels of the transmitted PPDU, $TX_{PWR_{max,i}}$ refers to the maximum allowable transmit power on ith subchannel.

$$TX_{PWR} = \sum_{i=1}^{N\_nonpunc} TX_{PWR_i}\ \text{where}\ TX_{PWR,i} \leq TX_{PWR_{max,i}} \quad \text{Equation 10}$$

Where N_nonpunc is the number of non-punctured subchannels of the transmitted PPDU, $TX_{PWR_{max,i}}$ refers to the maximum allowable transmit power on ith subchannel and $TX_{PWR_i}$ refers to the actual transmit power on ith subchannel.

One example of $f(\text{TX\_PWR}_{ref})$ is $$f(\text{TX\_PWR}_{ref}) = \frac{1}{N_{nonpunc}} \text{TX\_PWR}_{ref},$$

where N_nonpunc is the number of non-punctured subchannels in the transmitted PPDU. For example, $\text{TX\_PWR}_{ref}$ is 21 dBm for non-AP STAs. $\text{TX\_PWR}_{ref}$ is 21 dBm or 25 dBm for an AP. In the above statement, the transmitted subchannels of the transmitted PPDU may be same or different from the received PPDU sent from the OBSS STA. Note that if $TX_{PWR\_max\_i}$ is unconstrained, the STA may respect the transmit power restrictions by other rules.

The STA may also set a different transmit power on different subchannels if it satisfies the constraint in each subchannel given in Equation 8. Consequently, the OBSS_PDlevel in different subchannels may be different as well.

Although features and elements are described above in particular combinations, one of ordinary skill in the art will appreciate that each feature or element can be used alone or in any combination with the other features and elements. In addition, the embodiments described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A station (STA) comprising:

a receiver configured to receive a parameterized spatial reuse (PSR) reception (PSRR) trigger frame from an overlapping basic service set (OBSS) access point (AP), the PSRR trigger frame including a special user information field, the special user information field including a plurality of PSR subfields, each of the plurality of PSR subfields including a respective PSR value;

a processor configured to determine a received power level of the PSRR frame at the STA per each 20 MHz channel over which the PSRR frame is received;

the processor further configured to determine a transmission power for a PSR transmission (PSRT) frame to be transmitted by the STA to an associated AP in a channel having punctured subchannels and unpunctured subchannels, wherein the determined transmission power for the PSRT frame is based on a minimum PSR value, the minimum PSR value determined as a minimum of the plurality of respective PSR values, the determined received power level of the PSRR frame at the STA per each 20 MHz channel over which the PSRR frame is received, and an effective bandwidth of the PSRT frame, wherein the effective bandwidth of the PSRT frame is a bandwidth of the unpunctured subchannels of the PSRT frame; and a transmitter configured to transmit the PSRT frame at the determined transmission power for the PSRT frame.

2. A method for use in a station (STA), the method comprising:

receiving a parameterized spatial reuse (PSR) reception (PSRR) trigger frame from an overlapping basic service set (OBSS) access point (AP), the PSRR trigger frame including a special user information field, the special user information field including a plurality of PSR subfields, each of the plurality of PSR subfields including a respective PSR value;

determining a received power level of the PSRR frame at the STA per each 20 MHz channel over which the PSRR frame is received;

determining a transmission power for a PSR transmission (PSRT) frame to be transmitted by the STA to an associated AP in a channel having punctured subchannels and unpunctured subchannels, wherein the determined transmission power of the PSRT frame is based on a minimum PSR value, the minimum PSR value determined as a minimum of the plurality of respective PSR values, the determined received power level of the PSRR frame at the STA per each 20 MHz channel over which the PSRR frame is received, and an effective bandwidth of the PSRT frame, wherein the effective bandwidth of the PSRT frame is a bandwidth of the unpunctured subchannels of the PSRT frame; and transmitting the PSRT frame at the determined transmission power for the PSRT frame.

* * * * *